US012746176B1

(12) United States Patent
Jiang

(10) Patent No.: US 12,746,176 B1
(45) Date of Patent: Sep. 29, 2026

(54) METHOD AND DEVICE FOR INTERACTIVE CONTROLLING ON ADULT PRODUCT BASED ON MULTIMODAL MODEL, AND ADULT PRODUCT

(71) Applicant: CRAVELLE AI GROUP LIMITED, Hong Kong (HK)

(72) Inventor: Hua Jiang, Singapore (SG)

(73) Assignee: CRAVELLE AI GROUP LIMITED, Hong Kong (HK)

( * ) Notice: Subject to any disclaimer, the term of this patent is extended or adjusted under 35 U.S.C. 154(b) by 0 days.

(21) Appl. No.: 19/312,858

(22) Filed: Aug. 28, 2025

Related U.S. Application Data

(63) Continuation of application No. 19/275,239, filed on Jul. 21, 2025, now abandoned.

(51) Int. Cl.
*A61H 19/00* (2006.01)
*A61H 23/02* (2006.01)
(Continued)

(52) U.S. Cl.
CPC ......... *A61H 19/00* (2013.01); *A61H 23/0254* (2013.01); *A63H 3/28* (2013.01);
(Continued)

(58) Field of Classification Search
None
See application file for complete search history.

(56) References Cited

U.S. PATENT DOCUMENTS

2015/0305971 A1* 10/2015 Davis ..................... A61H 19/44 600/38
2017/0095398 A1* 4/2017 Courtion .............. A61N 5/0603
(Continued)

FOREIGN PATENT DOCUMENTS

CN 117579606 A * 2/2024 ............. H04L 67/34
CN 119131663 A * 12/2024 ............... G06N 3/08

*Primary Examiner* — Charles A Marmor, II
*Assistant Examiner* — Marc D. Honrath
(74) *Attorney, Agent, or Firm* — Studebaker Brackett PLLC

(57) ABSTRACT

The present disclosure discloses a method and a device for interactive controlling on adult product based on a multimodal model, and an adult product. Artificial Intelligence is utilized to control interaction for adult product, to address problem in the prior art that the adult product cannot be adjusted according to sexual activities by users and thus the user may feel less interactions. The method includes: acquiring perception data of a user, wherein the perception data includes one or more of modal data of voice data, tactile data, and visual data; conducting feature-extracting on each modal data in the perception data to obtain modal features corresponding thereto and conducting emotion recognition thereon; conducting feature-fusing on the modal features to form cross-modal features to determine a current user's emotion class; generating a control instruction for the adult product according to the current user's emotion class; converting the control instruction into drive signals for the adult product, so that the adult product performs actions corresponding to the drive signals. With technical solution provided in the present disclosure, intelligent interaction may be achieved between adult products and users and the user's experience is improved significantly.

12 Claims, 3 Drawing Sheets

(51) Int. Cl.

| | |
|---|---|
| ***A63H 3/28*** | (2006.01) |
| ***G06V 10/62*** | (2022.01) |
| ***G06V 10/77*** | (2022.01) |
| ***G06V 10/82*** | (2022.01) |
| ***G06V 40/16*** | (2022.01) |
| ***G10L 15/16*** | (2006.01) |
| ***G10L 15/18*** | (2013.01) |
| ***G10L 15/22*** | (2006.01) |
| ***G10L 25/24*** | (2013.01) |
| ***G10L 25/63*** | (2013.01) |
| ***H04L 9/40*** | (2022.01) |

(52) U.S. Cl.
CPC .......... *G06V 10/62* (2022.01); *G06V 10/7715* (2022.01); *G06V 10/82* (2022.01); *G06V 40/176* (2022.01); *G10L 15/16* (2013.01); *G10L 15/1815* (2013.01); *G10L 15/22* (2013.01); *G10L 25/24* (2013.01); *G10L 25/63* (2013.01); *H04L 63/0428* (2013.01); *H04L 63/08* (2013.01); *A61H 2201/0188* (2013.01); *A61H 2201/0207* (2013.01); *A61H 2201/1207* (2013.01); *A61H 2201/1238* (2013.01); *A61H 2201/1666* (2013.01); *A61H 2201/1676* (2013.01); *A61H 2201/5005* (2013.01); *A61H 2201/5028* (2013.01); *A61H 2201/5048* (2013.01); *A61H 2201/5058* (2013.01); *A61H 2201/5071* (2013.01); *A61H 2201/5082* (2013.01); *A61H 2201/5092* (2013.01); *G10L 2015/225* (2013.01)

(56) References Cited

U.S. PATENT DOCUMENTS

| | | | | |
|---|---|---|---|---|
| 2018/0140502 | A1* | 5/2018 | Shahoian ............... | A61H 19/44 |
| 2019/0175438 | A1* | 6/2019 | Cambridge ............ | A61H 19/44 |
| 2021/0154090 | A1* | 5/2021 | Mathews ............... | A61H 23/02 |
| 2025/0008184 | A1* | 1/2025 | Liu ...................... | G11B 27/031 |
| 2025/0114719 | A1* | 4/2025 | Liu ....................... | A63F 13/285 |

* cited by examiner

METHOD AND DEVICE FOR INTERACTIVE CONTROLLING ON ADULT PRODUCT BASED ON MULTIMODAL MODEL, AND ADULT PRODUCT

CROSS-REFERENCE TO RELATED APPLICATIONS

This application is a Continuation of U.S. patent application Ser. No. 19/275,239 filed Jul. 21, 2025, the entire contents of which are incorporated herein by reference.

TECHNICAL FIELD

The present disclosure relates to the field of interactive controlling on adult products based on artificial intelligence, specifically to a method and device for interactive controlling on adult product based on a multimodal model, and adult product.

BACKGROUND

With the advancement of social civilization, more and more attentions are made on addressing on physiological needs appropriately. Adult products, also known as sex toys, are widely used. Examples of adult product may include vibrators, massager, artificial vaginas, and silicone dolls. These products are primarily used to enhance or assist sexual experiences for adults to facilitate self-stimulation or use with a partner for sexual pleasure.

Currently, an amplitude or frequency with which the adult product works may be adjusted manually or remotely during using the product, but cannot be adjusted according to sexual activities by users and thus the user may feel less interactions so that the user experience in using such products may be degraded.

BRIEF SUMMARY

The present disclosure intends to address the problems in the prior art, such as less intelligent interaction, inaccurate user intent recognition, and insufficient personalized experience in adult products, by providing a method and a device for interactive controlling on adult product based on a multimodal model, and an adult product. In the present disclosure, intelligent interaction may be achieved between adult products and users with the combination of multimodal information processing and deep learning models, so as to improve the user experience significantly.

In a first aspect of the present disclosure, a method for dynamically controlling physical actuator of adult product, including:

- acquiring perception data of a user interacting with the adult product by at least one microphone and at least one sensor, wherein the perception data of the user includes one or more modal data of voice data and tactile data; the sensor includes at least one pressure sensor;
- processing the perception data of the user by using a processor to running a multimodal neural network model, which includes: conducting feature-extracting on each modal data in the perception data to obtain modal feature vectors corresponding thereto; applying an attention mechanism to each modal feature vector to obtain modal weights by calculation and generate a weighted cross-modal feature representation that quantifies an emotional state of the user; mapping the weighted cross-modal feature representation to a specific emotion class of the user selected from a predefined set of emotion classes;
- conducting search in a data structure of action parameter vectors to generate a multi-component action parameter vector, A=[a1, a2, . . . , an], wherein the data structure of action parameter vectors stores predefined action parameter vectors for each emotion class in the predefined set as a response to the specific emotion class of the user; each component of the action parameter vector under searching represents a specific numerical control value for an independent physical control dimension of the adult product, the physical control dimensions including at least vibration frequency and contraction intensity; and
- converting the numerical control values of the action parameter vector under searching into drive signals and transmitting the drive signals to the physical actuator, so that the adult product performs physical actions defined by the numerical control values.

Alternatively, the control instruction further includes one or more of the following: voice control instruction, configured to make selection among preset voice feedback templates and adjust voice parameters according to the emotion class.

atmosphere control instruction, configured to change one or more of brightness of a light source, color of a light source, flicker frequency of the light source, background music, based on the emotion class of the user.

Alternatively, the method for dynamically controlling physical actuator of adult product further includes:

- acquiring real-time feedback data from the user, wherein the feedback data includes behavior response; and
- dynamically adjusting predefined action parameter vectors stored in the data structure based on the real-time feedback data.

Alternatively, the method for dynamically controlling physical actuator of adult product further includes:

- determining a priority of each control instruction based on a preset weight of the user's emotion class;
- adjusting an execution sequence of a plurality of control instructions to ensure collaboration of the instructions and prevent conflicts therebetween;
- acquiring real-time feedback data from the user, including behavioral responses, and adjusting control strategies dynamically according to the real-time feedback data to optimize the user experience.

Alternatively, the step of conducting feature-extracting on each modal data in the perception data to obtain modal feature vectors corresponding thereto and conducting emotion recognition thereon includes:

- converting voice data using a pre-trained language model into voice text and extracting semantic representation vectors, when the perception data includes voice data; the pre-trained language model is subjected to adaptive training in an adult field with respect to vocabulary and expressions in the adult field;
- extracting fundamental audio features from the voice data using Mel-frequency cepstral coefficients; extracting acoustic feature vectors from the fundamental audio features using spectrum analysis, the acoustic feature vectors include fundamental frequency, energy, and harmonic-to-noise ratio; extracting high-dimensional voice representations using a self-supervised pre-trained speech encoder, to determine emotions and tones using an acoustic analyzer;

processing tactile data by using a multilayer perceptron network to extract tactile feature vectors when the perception data includes tactile data, the tactile feature vectors include one or more of touch pattern, touch force, touch rhythm, touch trajectory, touch area, and action frequency;

extracting facial expression features based on an improved FaceNet, when the perception data includes visual data, determining gazing duration and gazing frequency using a pupil tracking algorithm to obtain eye contact feature vectors; extracting body posture feature vectors using a human pose estimation model.

Alternatively, after determining emotion class of the user from a predefined set of emotion classes, the method further includes:

evaluating confidence of the emotion class by using a neural network.

Alternatively, the method for dynamically controlling physical actuator of an adult product further includes:

forming temporal sequence features from the modal features corresponding to each type of modal data within a preset period and determining dynamic changes in emotion recognitions by processing the temporal sequence features using a long short-term memory network, to determine an emotional trend;

determining a moment of change in emotion, by focusing on transition points in the temporal sequence features with attention weights.

Alternatively, the method for dynamically controlling physical actuator of an adult product further includes:

collecting user interaction data and feedback information;

updating parameters of the multimodal model dynamically using deep learning algorithms and reinforcement learning algorithms;

adjusting control logic to meet user's personalized needs adaptively and optimizing determining on user intent and control strategies.

Alternatively, the method for dynamically controlling physical actuator of an adult product further includes:

performing multi-factor authentication and authorization management on user identity to ensure that only authorized users can control the current adult product.

encrypting user data in a way of end-to-end to prevent unauthorized access and data leaks.

monitoring an execution process of the control instructions to block abnormal instructions to ensure safe use.

Alternatively, the method for dynamically controlling physical actuator of an adult product further includes:

downloading and installing a latest multimodal model parameters or control logic through a network connection or from a cloud platform, where the update process uses digital signatures and verification mechanisms to ensure the authenticity and integrity of the updated content.

In a second aspect, the present disclosure further provides a method for interactive controlling on adult product based on a multimodal model, including the following steps:

acquiring perception data of a user interacting with the adult product, wherein the perception data of the user includes one or more modal data of voice data and tactile data;

conducting feature-extracting on each modal data in the perception data to obtain modal feature vectors corresponding thereto;

conducting feature-fusing on the extracted modal feature vectors to form cross-modal feature representation so as to determine emotion class of the user from a predefined set of emotion classes;

conducting search in a data structure of action parameter vectors according to the emotion class of the user, to determine a control instruction for the adult product; and converting the control instruction into drive signals for the adult product, so that the adult product performs actions corresponding to the drive signals.

Alternatively, the step of the conducting search in a data structure of action parameter vectors according to the emotion class of the user, to determine a control instruction for the adult product includes:

conducting search in a data structure of action parameter vectors to generate a multi-component action parameter vector corresponding thereto, A=[a1, a2, . . . , an]. The data structure of action parameter vectors stores predefined action parameter vectors for each emotion class in the predefined set as a response to the specific emotion class of the user. The control instructions are configured to adjust one or more of the motion mode, intensity, or frequency of the adult product.

Each component a1, a2, . . . , an represents a specific numerical control value for an independent physical control dimension of the adult product, the physical control dimensions include one or more of vibration frequency, vibration intensity, contraction frequency, contraction intensity, swing amplitude, swing speed, temperature change amplitude, and pressure intensity of tactile feedback. A range of parameters of the physical control dimension corresponds to a preset set of movement patterns.

Alternatively, the step of conducting feature-fusing on the extracted modal feature vectors to form cross-modal feature representation so as to determine emotion class of the user from a predefined set of emotion classes includes:

projecting each modal feature vector into a common dimensional feature space by linear mapping, to generate aligned modal features;

determining attention scores between the aligned modal features by calculation, to determine modal weights for generating a weighted cross-modal feature representation, and generate a weighted cross-modal feature representation that quantifies the emotional state of the user;

mapping the weighted cross-modal feature representation to a specific emotion class of the user selected from a predefined set of emotion classes.

Alternatively, the control instruction further includes one or more of:

voice control instruction, configured to make selection among preset voice feedback templates and adjust voice parameters according to the emotion class;

atmosphere control instruction, configured to change one or more of brightness of a light source, color of a light source, flicker frequency of the light source, background music, based on the emotion class of the user.

Alternatively, the method for interactive controlling on adult product based on a multimodal model further includes:

performing multi-factor authentication and authorization management on user's identity to ensure that only authorized users control current adult product;

encrypting user data in a way of end-to-end to prevent unauthorized access and data leaks;

monitoring an execution process of the control instructions to block abnormal instructions when being detected, so as to ensure safe use.

Alternatively, the method for interactive controlling on adult product based on a multimodal model further includes:

downloading and installing a latest multimodal model parameters or control logic through a network connection or from a cloud platform, wherein the update process uses digital signatures and verification mechanisms to ensure authenticity and integrity of content being updated.

In a third aspect, the present disclosure further provides a device for interactive controlling on adult products based on a multimodal model, including:

a multimodal perception module configured to acquire perception data of a user interacting with the adult product, wherein the perception data of the user includes one or more modal data of voice data and tactile data;

a multimodal emotion recognition module configured to conduct feature-extracting on each modal data in the perception data to obtain modal feature vectors corresponding thereto;

a multimodal fusion module configured to conduct feature-fusing on the extracted modal feature vectors to form cross-modal feature representation so as to determine emotion class of the user from a predefined set of emotion classes;

an instruction generation module configured to conduct search in a data structure of action parameter vectors according to the emotion class of the user, to determine a control instruction for the adult product;

a control signal generation module configured to convert the control instruction into drive signals for the adult product, so that the adult product performs actions corresponding to the drive signals.

Alternatively, the instruction generation module conducting search in a data structure of action parameter vectors according to the emotion class of the user, to determine a control instruction for the adult product includes:

conducting search in a data structure of action parameter vectors to generate a multi-component action parameter vector corresponding thereto, A=[a1, a2, . . . , an], wherein the data structure of action parameter vectors stores predefined action parameter vectors for each emotion class in the predefined set as a response to the specific emotion class of the user; the control instructions are configured to adjust one or more of the motion mode, intensity, or frequency of the adult product, wherein, each component a1, a2, . . . , an represents a specific numerical control value for an independent physical control dimension of the adult product, the physical control dimensions include one or more of vibration frequency, vibration intensity, contraction frequency, contraction intensity, swing amplitude, swing speed, temperature change amplitude, and pressure intensity of tactile feedback, a range of parameters of the physical control dimension corresponds to a preset set of movement patterns.

Alternatively, the control instruction further includes one or more of the following:

voice control instruction, configured to make selection among preset voice feedback templates and adjust voice parameters according to the emotion class;

atmosphere control instruction, configured to change one or more of brightness of a light source, color of a light source, flicker frequency of the light source, background music, based on the emotion class of the user Alternatively, the device further includes:

an encryption module configured to perform multi-factor authentication and authorization management on user identity to ensure that only authorized users can control the current adult product; encrypt user data in a way of end-to-end to prevent unauthorized access and data leaks; monitor an execution process of the control instructions to block abnormal instructions to ensure safe use.

Alternatively, the device further includes:

a remote update module configured to download and install a latest multimodal model parameters or control logic through a network connection or from a cloud platform, where the update process uses digital signatures and verification mechanisms to ensure the authenticity and integrity of the updated content.

In a fourth aspect, the present disclosure further provides an adult product based on a multimodal model, including: a housing, a primary control component, a driving component, an execution component and an information acquisition component provided in or on the housing;

the information acquisition component includes at least one microphone and at least one sensor, the sensor includes at least one pressure sensor; the information acquisition is configured to acquire perception data of a user interacting with the adult product, wherein the perception data of the user includes one or more modal data of voice data and tactile data;

the primary control component is configured to process the perception data of the user by running a multimodal neural network model, the processing the perception data of the user includes: extracting voice feature vector from the voice data, and extracting tactile feature vector from a tactile data; applying an attention mechanism to the voice feature vector and the tactile feature vector to obtain modal weights by calculation and generate a weighted cross-modal feature representation that quantifies an emotional state of the user; mapping the weighted cross-modal feature representation to a specific emotion class of the user selected from a predefined set of emotion classes; conducting search in a data structure of action parameter vectors to generate a multi-component action parameter vector, A=[a1, a2, . . . , an], wherein the data structure of action parameter vectors stores predefined action parameter vectors for each emotion class in the predefined set as a response to the specific emotion class of the user; each component of the action parameter vector under searching represents a specific numerical control value for an independent physical control dimension of the adult product, the physical control dimensions including at least vibration frequency and contraction intensity;

the driving component is configured to convert the numerical control values of the action parameter vector under searching into drive signals;

the execution component is configured to performs physical actions defined by the numerical control values.

Alternatively, the sensors include: a camera, a temperature sensor, a light sensor, and a sound sensor.

Alternatively, the driving component includes one or more of a motor, a servo motor, a pneumatic element, and a hydraulic element.

Alternatively, the execution component includes one or more of a microphone, a switch, a heater, a linear actuator, and a rotary actuator.

In a fifth aspect, the present disclosure provides a device for interactive controlling on adult products, including: at least one microphone and at least one sensor, one or more physical actuators; a processor; and a memory storing instructions thereon, when the instructions are executed by the processor, the device implements the steps of the methods as described above.

In a sixth aspect, the present disclosure provides an electronic apparatus including a memory, a processor, and a computer program stored in the memory and executable on the processor, wherein the processor executes the program to implement the steps of the methods as described above.

In a seventh aspect, the present disclosure provides a computer-readable storage medium storing a computer program, wherein when the computer program is executed by a processor, it implements the steps of the method for interactive controlling on adult product based on a multimodal model.

Compared to the prior art, the embodiments of the present disclosure have at least the following advantageous effects.

The method for interactive controlling on adult product based on a multimodal model according to the embodiments of the present disclosure may achieve intelligent interaction by perceiving various modal data of the user, such as voice, text, images, and body movements with the multimodal model, to recognize the user's emotions accurately, and generating control instructions corresponding to the user's emotions, so that the adult product may be controlled to perform corresponding actions to implement intelligent interaction between the adult product and the user.

The method for interactive controlling on adult product based on a multimodal model according to the embodiments of the present disclosure addresses problems due to single interaction mode and unintelligent response in the prior art by using multimodal model technology so that higher interaction accuracy and adaptability may be achieved.

BRIEF DESCRIPTION OF THE DRAWINGS

According to the description of non-limiting embodiments with reference to the following drawings, other features, objectives, and advantages of the present disclosure will become more obvious.

DETAILED DESCRIPTION

Figure 1:
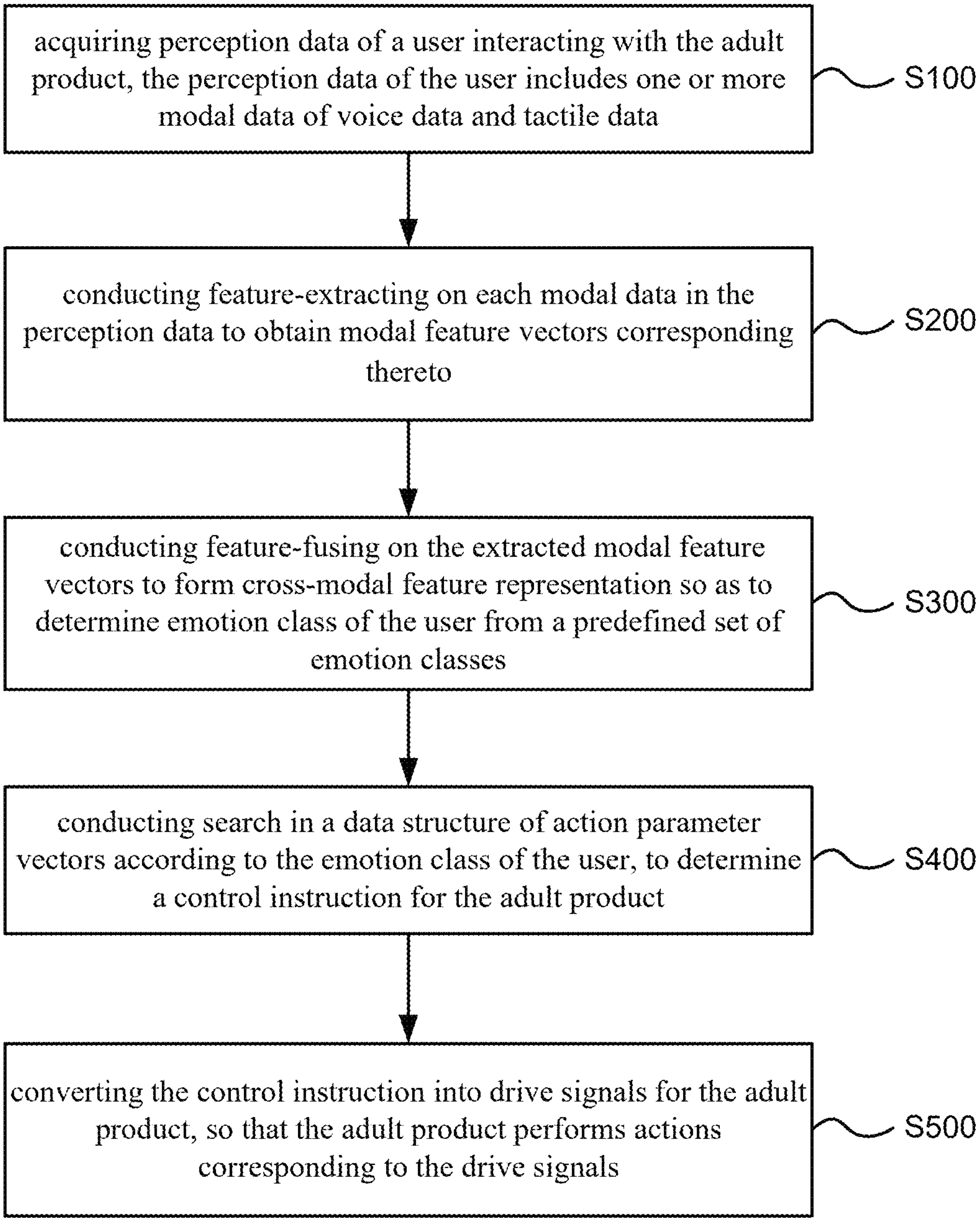
FIG. 1 is a flowchart showing the method for interactive controlling on adult product based on a multimodal model according to an exemplary embodiment of the present disclosure.

Detailed description would be made on the present disclosure in conjunction with specific embodiments. The following embodiments will facilitate understanding of skilled in the art on the present disclosure but place no limitation on the present disclosure in any way. It should be noted that various modifications and improvements can be made by skilled in the art without departing from the spirit of the present disclosure, which all fall within the scope of as claimed in the present disclosure.

It should be noted that the user information (including, but not limited to, user device information, user personal information, etc.) and data (including, but not limited to, analyzed data, stored data, displayed data, etc.) involved in the present disclosure are all authorized by the user or fully authorized by all parties. The collection, use, and processing of the relevant data must comply with relevant regulations.

The adult products described in the present disclosure may include various tangible adult products capable of interacting with users, including, but not limited to, massagers, vibrators, or other adult products with similar functions for female users; simulated vaginas, silicone dolls, or other adult products with similar functions for male users; and other adult products that can stimulate or influence users' sexual experiences and emotions. However, currently, an amplitude or frequency with which the adult product works may be adjusted manually or remotely during using the product, but cannot be adjusted according to sexual activities by users and thus the user may feel less interactions so that the user experience in using such products may be degraded and the user's intent expressed through language (text), voice (emotion), or body movements (intensity, frequency) cannot be understood properly, and the overall experience is degraded. Furthermore, there is no comprehensive processing on multimodal information (such as voice, text, images, body movements, and external environmental information) or methods for accurately recognizing user emotions using deep learning models (such as multimodal models) and generating corresponding control instructions in the prior art. Additionally, there are significant deficiencies in personalized user experience, real-time feedback, and safety assurance, and thus it is difficult to meet the higher demands for intelligent and emotional interaction. To address the above problems, the embodiments of the present disclosure provide a method for interactive controlling on adult product based on a multimodal model, which offers more intelligent interactions and provides users with a more immersive interactive experience.

In the following embodiments, in order to implement intelligent control for adult products (such as massagers, vibrators, or other adult products with similar functions for female users; simulated vaginas, silicone dolls, or other adult products with similar functions for male users; and other adult products that can stimulate or influence users' sexual experiences and emotions), information acquisition components such as sensors may be provided on the adult product itself or at the user. Additionally, controllable components such as motors, motion components, or driving components in specific parts of the adult product may be included. For example, sensors may be placed at each joint of silicone dolls to sense body movements. Driving components such as motors, servo motors, pneumatic elements, or hydraulic elements may be further included to control the movement of specific joints or components according to control instructions, so as to enable movements of parts of the silicone doll. Alternatively, the adult product may be connected to an app, which users may input voice, text, or image information thereby and may be provided on smart devices such as smartphones or smartwatches.

To achieve the above objectives, one embodiment of the present disclosure provides a method for dynamically controlling physical actuator of adult product, including:

a) acquiring perception data of a user interacting with the adult product by at least one microphone and at least one sensor, the perception data of the user includes one or more modal data of voice data and tactile data; the sensor includes at least one pressure sensor;

b) processing the perception data of the user by using a processor to running a multimodal neural network model, and particularly with the steps of 1) conducting feature-extracting on each modal data in the perception data to obtain modal feature vectors corresponding thereto; 2) applying an attention mechanism to each modal feature vector to obtain modal weights by calculation and generate a weighted cross-modal feature representation that quantifies an emotional state of the user; 3) mapping the weighted cross-modal feature representation to a specific emotion class of the user selected from a predefined set of emotion classes;

c) conducting search in a data structure of action parameter vectors to generate a multi-component action parameter vector, A=[a1, a2, . . . , an], wherein the data structure of action parameter vectors stores predefined action parameter vectors for each emotion class in the predefined set as a response to the specific emotion class of the user; each component of the action parameter vector under searching represents a specific numerical control value for an independent physical control dimension of the adult product, the physical control dimensions including at least vibration frequency and contraction intensity; and d) converting the numerical control values of the action parameter vector under searching into drive signals and transmitting the drive signals to the physical actuator, so that the adult product performs physical actions defined by the numerical control values.

In the embodiments of the present disclosure, the control instruction further includes one or more of the following:

voice control instruction, configured to make selection among preset voice feedback templates and adjust voice parameters according to the emotion class;

atmosphere control instruction, configured to change one or more of brightness of a light source, color of a light source, flicker frequency of the light source, background music, based on the emotion class of the user.

In the embodiments of the present disclosure, the method for dynamically controlling physical actuator of adult product further includes:

acquiring real-time feedback data from the user, wherein the feedback data includes behavior response; and dynamically adjusting predefined action parameter vectors stored in the data structure based on the real-time feedback data.

In the embodiments of the present disclosure, the method for dynamically controlling physical actuator of adult product further includes:

determining a priority of each control instruction based on a preset weight of the user's emotion class;

adjusting an execution sequence of a plurality of control instructions to ensure collaboration of the instructions and prevent conflicts therebetween;

acquiring real-time feedback data from the user including behavioral responses, and adjusting control strategies dynamically to optimize the user's experience.

In the embodiments of the present disclosure, the conducting feature-extracting on each modal data in the perception data to obtain modal feature vectors corresponding thereto includes:

converting voice data using a pre-trained language model into voice text and extracting semantic representation vectors, when the perception data includes voice data;

extracting fundamental audio features from the voice data using Mel-frequency cepstral coefficients; extracting acoustic feature vectors from the fundamental audio features using spectrum analysis, the acoustic feature vectors include fundamental frequency, energy, and harmonic-to-noise ratio;

processing tactile data by using a multilayer perceptron network to obtain tactile features vectors corresponding to tactile data, when the perception data includes tactile data, the tactile feature vectors include one or more of touch pattern, touch force, touch rhythm, touch trajectory, touch area, and action frequency;

extracting facial expression features based on an improved FaceNet, when the perception data includes visual data, determining gazing duration and gazing frequency using a pupil tracking algorithm to obtain eye contact feature vectors; extracting body posture feature vectors using a human pose estimation model.

In the embodiments of the present disclosure, after determining emotion class of the user from a predefined set of emotion classes, the method further includes:

evaluating confidence of the emotion class by using a neural network.

In the embodiments of the present disclosure, the method for dynamically controlling physical actuator of adult product further includes:

forming temporal sequence features from the modal features corresponding to each type of modal data within a preset period and determining dynamic changes in emotion recognitions by processing the temporal sequence features using a long short-term memory network, to determine an emotional trend;

determining a moment of change in emotion, by focusing on transition points in the temporal sequence features with attention weights.

In the embodiments of the present disclosure, the method for dynamically controlling physical actuator of adult product further includes:

collecting user's interaction data and feedback information;

updating parameters of the multimodal model dynamically using deep learning algorithms and reinforcement learning algorithms;

adjusting control logic to meet user's personalized needs adaptively and optimizing determining on user intent and control strategies.

In the embodiments of the present disclosure, the method for dynamically controlling physical actuator of adult product further includes:

performing multi-factor authentication and authorization management on user's identity to ensure that only authorized users control current adult product;

encrypting user data in a way of end-to-end to prevent unauthorized access and data leaks;

monitoring an execution process of the control instructions to block abnormal instructions when being detected, so as to ensure safe use.

In the embodiments of the present disclosure, the method for dynamically controlling physical actuator of adult product further includes:

downloading and installing a latest multimodal model parameters or control logic through a network connection or from a cloud platform, wherein the update process uses digital signatures and verification mechanisms to ensure authenticity and integrity of content being updated.

Embodiments of the present disclosure provide a method for interactive controlling on adult product based on a multimodal model, starting with step S100.

S100. acquiring perception data of a user interacting with the adult product, wherein the perception data of the user includes one or more modal data of voice data and tactile data.

Specifically, in this step, information acquisition components such as sensors or sensing sheets may be provided on the adult product itself or at the user. Various technologies and devices may be used to acquire perception data such as voice, text, images, body movements, and external environmental information.

For example, voice data may be acquired via a microphone, and the acquired voice data may be further processed for recognition to be converted into text. Text information may be input via input devices. Visual data may include images or videos stored by the user or images or videos captured by a camera. Specifically, body movements may be obtained using high-speed cameras during tracking movements of human, or user movements may be obtained by using devices such as inertial measurement units, including, but not limited to, wearable devices (such as smartwatches). External environmental information may be acquired via sensors related thereto based on type of required information. For example, light sensors may acquire ambient brightness, temperature sensors may acquire ambient temperature, and sound sensors may acquire environmental sounds (such as music).

In the present embodiment, one or more types of perception data may be acquired as described above, with each type of data corresponding to a modal.

S200. conducting feature-extracting on each modal data in the perception data to obtain modal feature vectors corresponding thereto.

In this step, feature extraction is conducted on each type of perception data to generate modal feature vectors corresponding thereto.

Specifically, feature extraction is conducted respectively for each type of perception data to generate single-modal feature representations. For example, feature extraction may be conducted on voice data to generate single-modal feature vectors corresponding to voice. Similarly, feature extraction may be conducted on tactile data to generate single-modal feature vectors corresponding to tactile data, and feature extraction may be conducted on visual data to generate single-modal feature vector corresponding to visual data.

S300. conducting feature-fusing on the extracted modal feature vectors to form cross-modal feature representation so as to determine emotion class of the user from a predefined set of emotion classes.

In this step, a multimodal model is used, and can use a prior model as the fundamental architecture. The multimodal model is pre-trained to recognize the user's current emotion class according to modal features.

After feature extraction is conducted on each type of perception data in step S200, a plurality of modal features, i.e., multimodal features, are obtained. Cross-attention processing is performed on the multimodal features to generate a unified feature representation.

In some embodiments, collected perception data may be used as training data in pre-training for the multimodal model, so that a multimodal model capable of recognizing user emotion class may be obtained. The feature representations obtained above are input into the trained multimodal model to recognize the user's emotion class.

In the present step, the user's emotion class may be recognized and determined based on one or more modal features in the perception data.

In embodiments, the user's emotion class may be set according to the practical situation of the adult product, and the user's emotion class may be recognized based on one or more types of perception data. The adult product mentioned in the present embodiment may be any adult product capable in providing interaction, including various shapes of adult dolls or other intelligent adult products.

S400. conducting search in a data structure of action parameter vectors according to the emotion class of the user, to determine a control instruction for the adult product.

Control instructions may be generated according to o the user's emotion class, after the user's emotion class is determined in S300. Such control instructions may be configured to control the actionable or controllable parts of the adult product, to enable personalized intelligent interaction based on the user's needs and improve the user's experience. For example, the control instructions may include controlling the operating mode of the adult product, adjusting its working frequency, increasing or decreasing its motion amplitude, controlling expression of the adult product, providing feedback for voice chat, controlling movements of joints of the adult product, and other controllable parts that simulate human sexual behaviors.

S500. converting the control instruction into drive signals for the adult product, so that the adult product performs actions corresponding to the drive signals.

The control instructions correspond to specific user emotion class. The control instructions may be converted into drive signals suitable for the adult product when received in S400. These drive signals are transmitted to the control system or actuators of the adult product via physical interfaces (wired or wireless modules) to ensure that the drive signals effectively control or drive the corresponding parts of the adult product.

In the above embodiments of the present disclosure, with steps S100 to S500, feature representations may be obtained according to the information obtained from the user terminal and user's intent may be recognized by using the multimodal model and control instructions may be generated correspondingly according to the recognized user's intent. In the embodiments of the present disclosure, the multimodal model is applied in controlling on the adult products, i.e., human language, text, voice, emotions, body movements, and other data are perceived by using the multimodal model, so that user's intent may be recognized accurately, and the adult product may be controlled to respond accordingly based on the user's intent to form real-time intelligent interaction between the adult product and the user during use and improve the user's experience.

In using, although interaction requirements may be partially met by using single-modal features corresponding to a single modal, there may be instability caused by noise and other factors. To better recognize the user's emotion class, in step S200, user information may include two or more types of perception data.

In one embodiment of the method for interactive controlling on adult product based on a multimodal model according to the present disclosure, step S200 may include:

converting voice data using a pre-trained language model into voice text and extracting semantic representation vectors, when the perception data includes voice data; conducting recognition of emotional words and relationships using an emotional lexicon and semantic dependency analysis, the pre-trained language model is subjected to adaptive training in an adult field with respect to vocabulary and expressions in the adult field;

extracting fundamental audio features from the voice data using Mel-frequency cepstral coefficients; extracting acoustic feature vectors from the fundamental audio features using spectrum analysis, the acoustic feature vectors include fundamental frequency, energy, and harmonic-to-noise ratio; extracting high-dimensional voice representations using a self-supervised pre-trained speech encoder, to determine emotions and tones using an acoustic analyzer;

processing tactile data by using a multilayer perceptron network to extract tactile feature vectors when the perception data includes tactile data, the tactile feature vectors include one or more of touch pattern, touch force, touch rhythm, touch trajectory, touch area, and action frequency; and mapping the tactile features to a feature space related to emotions by nonlinear transformation.

extracting facial expression features based on an improved FaceNet, when the perception data includes visual data, determining gazing duration and gazing frequency using a pupil tracking algorithm to obtain eye contact feature vectors; extracting body posture features using a human pose estimation model; determining emotional states based on the facial expression features, eye contact feature vectors, and body posture features.

In this step, the perception data may be subjected to feature vectorization processing to generate feature vectors for emotional and sentiment processing and analysis.

In one embodiment of the method for interactive controlling on adult product based on a multimodal model according to the present disclosure, step S300 may include:

the step of conducting feature-fusing on the modal features to form cross-modal features to determine a current user's emotion class includes:

projecting each modal feature vector into a common dimensional feature space by linear mapping, to generate aligned modal features;

determining attention scores between the aligned modal features by calculation, to determine modal weights for generating a weighted cross-modal feature representation, and generate a weighted cross-modal feature representation that quantifies the emotional state of the user;

mapping the weighted cross-modal feature representation to a specific emotion class of the user selected from a predefined set of emotion classes.

In the embodiments of the present disclosure, first of all, one or more extracted modal features may be mapped through linear mapping and projecting aligned modal features into a feature space in a preset dimension;

secondly, correlation between a plurality of modal features may be determined by using an attention mechanism and conducting feature-fusing on the aligned modal features based on the correlation to form cross-modal feature representations;

at last, a distribution of possibilities for mapping the cross-modal features to various emotion classes may be determined by using a multilayer feedforward neural network and the current user's emotion class may be determined according to the probabilities.

The attention mechanism is used to determine the correlation between multiple modal features. Based on this correlation, the aligned modal features are fused to form cross-modal features.

A multilayer feedforward neural network is used to determine the probability distribution of the cross-modal features mapped to different emotion class, and the user's current emotion class is determined based on these probabilities.

The attention mechanism allows different parts of the features to be assigned with different weights automatically during processing, so as to better focus on and utilize important information. In this step, modal features are aligned by using the attention mechanism to learn how to focus on the correlation and importance between different modal features, and effectively capture the interrelationships between different modalities, so that overall performance and robustness may be improved. The attention mechanism may be implemented using neural networks to generate a series of attention vectors. These attention vectors represent key features in the input and are used to generate alignment results, so that modal features from different data sources remain consistent in terms of semantics and spatial dimensions.

In this step, the modal features are aligned for recognition of the user's emotion class, which may include mapping different modal features into same feature space, so that they may be understood and interacted with each other in this space.

In embodiments, the attention mechanism may be implemented using a Transformer model. The Transformer model may map features from different modalities into a shared feature space, so that features from different modalities may be compared and interacted with each other in the same space. This interaction may be achieved by using a cross-modal attention layer. Of course, in other embodiments, other attention mechanism networks may be used and there is no limitation thereon.

In some embodiments, to fuse the aligned features into cross-modal features, the step of fusing may further include: cascaded concatenation fusion, inter-modal relationship modeling, and deep feature extraction as described in detail below.

Cascaded concatenation fusion: directly concatenating all aligned modal features into a high-dimensional feature vector, to form initially fused cross-modal features, wherein the high-dimensional feature vector contains complete information from all modalities.

Inter-modal relationship modeling (attention mechanism): calculating attention mechanism the weight of each modal on the concatenated high-dimensional feature vector dynamically, and weighting concatenated features according to the modal weights to obtain weighted fused cross-modal features.

Deep feature extraction: inputting the weighted fused features into a deep learning network to further extract nonlinear relationships between modalities, and generating final cross-modal features.

In this embodiment, cascaded concatenation fusion, inter-modal relationship modeling, and deep feature extraction are used to fuse the aligned features into cross-modal features. With the combination of cascaded concatenation fusion and deep feature extraction, the maximum amount of information from different modalities is retained, and complex inter-modal interactions are effectively captured.

In the above embodiments of the present disclosure, the fusion of multimodal features may improve stability and generalization performance under different conditions, construct richer and more comprehensive semantic representations, and facilitate the understanding and processing of complex tasks, so that the intelligence of interaction between the adult product and the user may be further improved.

To further improve the classification of user emotion class, the user emotion class may further include emotional state quantification features. These features may be used to precisely control or adjust the control instructions of adult products during use by analyzing changes in emotional state quantification features. The emotional state quantification features refer to a quantitative expression of the user's emotion class, which can accurately reflect the user's emotion changes during using adult products. Emotional state quantification features may be achieved by adding a classifier during training of the neural network model to enable quantification and classification of emotion class. For instance, when the user's emotion class is recognized as "like," the "like" emotion class may be quantified and represented using a feature vector, such as a scale from 0 to 10. A value of 0 indicates no emotion detected, 1-2 may represent a mild state, 3-5 may represent a normal state, 5-7 may represent a strong state, and 8-10 may represent an extreme state.

For example, when the user's current emotion class is determined as "like" and the emotional state quantification feature is 1-2, it can be considered as mild liking. In this case, the vibration intensity, frequency, and other parameters of the adult product may be controlled to be low. If the emotional state quantification feature is 5-7, it indicates strong liking, and the vibration intensity, frequency, motion amplitude, and other parameters of the adult product may be increased. Similarly, different settings may be applied to different modes and parameters of the adult product based on the emotional state quantification features correspondingly. For instance, an adult product may provide different feedback based on varying quantified features of the "like" emotional state within the 0-10 scale of emotional state quantification features. For example, when the emotional state quantification feature is 0, it may mean a neutral expression with no action. When the feature is 1-2, it means mild liking, and the product may show a slight smile. When the feature is 3-5, it means a normal state of "like," and the product may show a noticeable smile (with a larger curvature of the mouth) with slight movements (such as nodding and/or body movements). When the feature is 5-7, it means a strong state of "like," and the product may show a laughing expression with larger body movements. Correspondingly, when the feature is 8-10, the product may show an exuberant laugh along with more expressions and larger body movements, to implement precise interactions in terms of expressions and gestures similar to those of a real person.

It should be noted that all control or parameter adjustments of the adult product are conducted within a safety range of the product. The above examples are for illustrative purposes only. In other embodiments, other classification methods and expressions may be used according to the specific usage scenarios and conditions of the adult product.

In some preferred embodiments, after the user's emotion class is recognized in step S300, the corresponding step S400 of conducting search in a data structure of action parameter vectors according to the emotion class of the user, to determine a control instruction for the adult product includes:

- conducting search in a data structure of action parameter vectors to generate a multi-component action parameter vector corresponding thereto, A=[a1, a2, . . . , an], wherein the data structure of action parameter vectors stores predefined action parameter vectors for each emotion class in the predefined set as a response to the specific emotion class of the user; the control instructions are configured to adjust one or more of the motion mode, intensity, or frequency of the adult product,
- each component a1, a2, . . . , an represents a specific numerical control value for an independent physical control dimension of the adult product, the physical control dimensions include one or more of vibration frequency, vibration intensity, contraction frequency, contraction intensity, swing amplitude, swing speed, temperature change amplitude, and pressure intensity of tactile feedback, a range of parameters of the physical control dimension corresponds to a preset set of movement patterns.

In the embodiments of the present disclosure, a control instruction may be generated according to the emotion class, wherein the control instruction is configured to change one or more of a movement mode, an intensity, or a frequency in which the adult product is operating. The control instruction is represented as an action parameter vector A=[a1, a2, . . . , an].

More particularly, each of the components a1, a2, . . . , an represents an independent physical control dimension for the adult product. The physical control dimension may include one or more of the following: vibration frequency, vibration intensity, contraction frequency, contraction intensity, swing amplitude, swing speed, temperature change amplitude, and pressure intensity of tactile feedback. A range of parameters of the physical control dimension corresponds to a preset set of movement patterns.

When the emotion class is defined with the above-mentioned emotional state quantification features, the corresponding process in step S400 for generating control instructions includes:

- analyzing the emotional state quantification features to generate control parameters for one or more of motion mode, intensity, or frequency of the adult product and generating control instructions.

In the above embodiments of the present disclosure, control instructions and parameters are generated correspondingly based on recognized user's current emotion class, emotional state quantification features, and external environmental information, so that the user's experience may be optimized, and interaction intelligence and accuracy may be significantly improved.

The above preferred embodiments further define the user's emotion class and emotional state level by using emotional state quantification features. During the interaction between the adult product and the user, the emotional state quantification features allow precise control or adjustment of the state and/or parameters during use of the adult products, to provide better emotional feedback for the user, including voice interaction feedback, adjustments to the working modes and parameters of the adult product, and humanoid operational feedback from the adult product. This approach is more intelligent and accurate than the solution of merely interacting based on a single emotional recognition and meets user needs more.

In the above embodiments of the present disclosure, after the user's emotion class (including emotional state quantification features) is recognized accurately by using the multimodal model, control instructions are generated correspondingly based on the recognized emotion class. In some embodiments, the control instructions are represented as an action parameter vector A=[a1, a2, . . . , an].

Each of the components a1, a2, . . . , an represents an independent physical control dimension for the adult product. The physical control dimension may include one or more of the following: vibration frequency, vibration intensity, contraction frequency, contraction intensity, swing amplitude, swing speed, temperature change amplitude, and pressure intensity of tactile feedback. A range of parameters of the physical control dimension corresponds to a preset set of movement patterns.

The control instruction further includes voice control instruction, atmosphere control instruction, or the like.

More particularly, the control instruction may be configured to adjust one or more of the motion mode, intensity, or frequency of the adult product. The voice control instruction may make selection among preset voice feedback templates and adjust voice parameters (such as voice tune or content) according to the emotion class. A range of parameters of the motion mode corresponds to a preset set of movement patterns and may be determined according to type or structure of the adult product. Intensity or frequency may refer to the intensity or frequency of vibrations, movements, etc., of the adult product, as well as the intensity or frequency of the product's action feedback or voice response. For example, if the feedback expression is "like," it may be a mild like or a strong like. The adult product may perform different interactions with the user in terms of motion and voice under different emotional features. The entire process simulates reactions of real human as closely as possible in tone or actions (such as movements of human-like joints) to create a realistic interactive scenario.

Furthermore, atmosphere control instruction for adult products may be further included to optimize the atmosphere where the user uses the adult product. The atmosphere control instruction is configured to change one or more of brightness of a light source, color of a light source, flicker frequency of the light source, background music, based on the emotion class of the user. The atmosphere control instruction in the embodiments of the present disclosure may be configured to change one or more of brightness, color, flicker frequency of lighting, background music to match the user's emotions.

In the embodiments of the present disclosure, real-time feedback data may be acquired from the user and the feedback data may include behavioral responses, and control strategies may be dynamically adjusted according the real-time feedback data to optimize the user's experience.

In the above embodiments of the present disclosure, intelligent interaction may be achieved accurately by recognizing the user's emotions and generating corresponding control instructions. Furthermore, to provide more options and better user's experience, in some embodiments, the method for interactive controlling on adult product based on a multimodal model according to the present disclosure further includes scheduling the control instructions, which may include determining a priority of each control instruction based on a preset weight of the user's emotion class; adjusting an execution sequence of a plurality of control instructions to ensure collaboration of the instructions and prevent conflicts therebetween. Furthermore, the method according to the present disclosure may further include: acquiring real-time feedback data from the user, including behavioral responses, and adjusting control strategies dynamically in combined with environmental information and emotional state quantification features to optimize the user experience.

In the above embodiments, description is made on recognizing user emotion recognition and generating control instruction. For better understanding, in some embodiments, the process of generating control instructions based on the recognized user emotion class and emotional state quantification features may include:

M1. determining a target control type, such as motion, voice, or atmosphere control.

M2. determining preset control parameters based on the user's emotional state and/or external environmental information (such as light brightness, background music, temperature, etc.).

M3. adjusting control parameters, such as motion intensity, frequency, voice volume and tone, light brightness and color, etc., dynamically, to generate an action parameter vector, so that the control instructions remain consistent with the user's emotional state and/or environmental state.

M4. generating a final comprehensive control instructions and further optimizing the instruction parameters by using a real-time feedback mechanism (such as user behavioral responses).

It should be noted that in some embodiments, the process of generating control instructions may further include:

(1) determining the user's emotion level (such as relaxed, excited, or tense) based on the emotional state quantification features and quantifying the corresponding value range of the action parameter vector A=[a1, a2, . . . , an];

(2) analyzing external environmental information (such as light brightness, background music, temperature, etc.) and determining a preset optimization strategy based on the emotional state quantification features;

(3) adjusting the parameters of the action parameter vector A=[a1, a2, . . . , an](such as vibration intensity range, light color and brightness, volume, etc.) dynamically so that the control instructions remain consistent with the user's emotional and environmental states.

(4) generating a final comprehensive control instruction and further optimizing the instruction parameters via a real-time feedback mechanism (such as user behavioral responses).

According to the above embodiments of the present disclosure, to continuously improve the control on adult products during use, in some embodiments, the method for interactive controlling on adult product based on a multimodal model may further optimize user emotion recognition and control strategies. Specifically, the method for interactive controlling on adult product based on a multimodal model may include the following optimizations for machine learning: collecting user interaction data and feedback information; updating parameters of the multimodal model dynamically using deep learning algorithms and reinforcement learning algorithms; adjusting control logic to meet user's personalized needs adaptively and optimizing determining on user intent and control strategies to improve the intelligence of the system.

To ensure security of user data and protect user privacy, according to the above embodiments of the present disclosure, the method for interactive controlling on adult product based on a multimodal model may further include multifactor authentication and authorization management for user identity, so that only authorized users may control the adult product. Additionally, user data may be processed with end-to-end encryption to prevent unauthorized access and data breaches. Furthermore, the execution process of control instructions may be monitored in real-time to detect and block abnormal instructions, ensuring safe usage.

According to the above embodiments of the present disclosure, the method for interactive controlling on adult product based on a multimodal model may further include downloading and installing a latest multimodal model parameters or control logic through a network connection or from a cloud platform, where the update process uses digital signatures and verification mechanisms to ensure the authenticity and integrity of the updated content.

Figure 2:
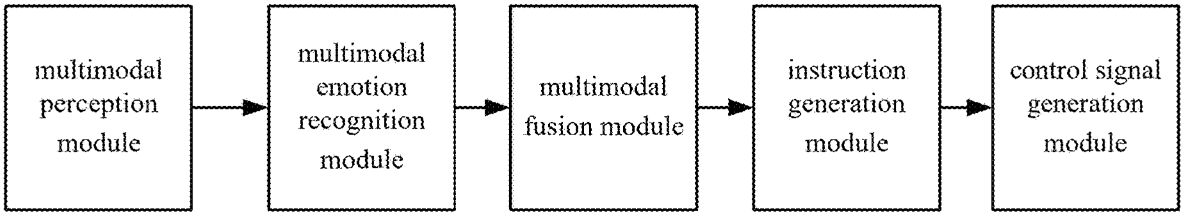
FIG. 2 is a block diagram showing function units of the device for interactive controlling on adult product based on a multimodal model according to an exemplary embodiment of the present disclosure.
Figure 3:
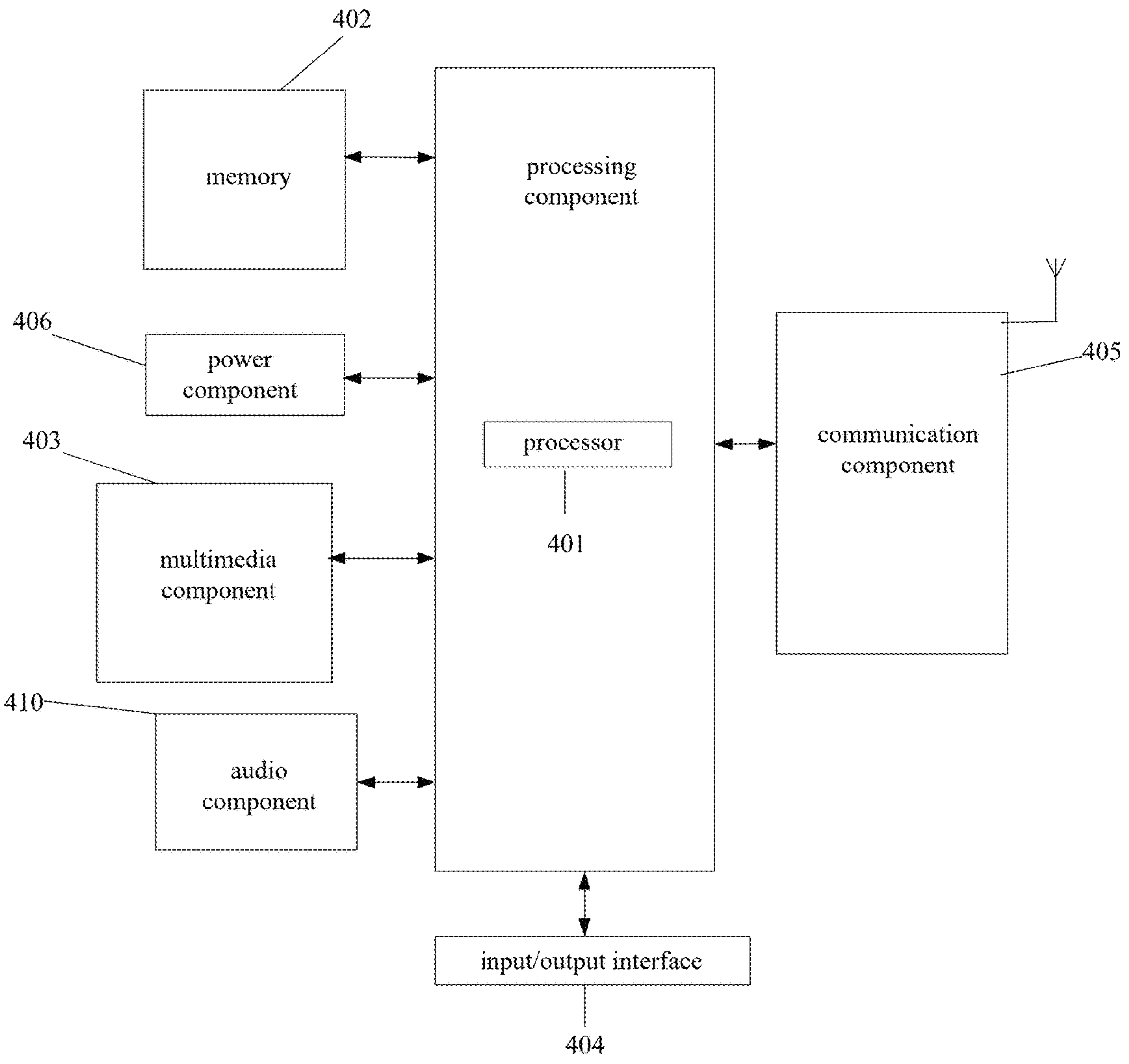
FIG. 3 is a block diagram showing the electronic apparatus according to an exemplary embodiment of the present disclosure.

Referring to FIG. 2, to better recognize user's intent, in another embodiment, when user's information is of multiple types (two or more) such as voice, text, image, body movements, and external environmental information, the multimodal model may includes two or more of a speech understanding unit, a voice emotion recognition unit, a facial expression recognition unit, a motion recognition unit, and a context understanding unit. The multimodal model may further include a multimodal semantic fusion unit. The speech understanding unit, voice emotion recognition unit, facial expression recognition unit, motion recognition unit, and context understanding unit correspond to each of unimodal features, while the multimodal semantic fusion unit performs semantic fusion on multiple modal features to obtain the fused multimodal features.

The method for interactive controlling on adult product based on a multimodal model according to the embodiments of the present disclosure may implement personalized feedback. By dynamically adjusting control parameters based on the user's emotional state quantification features and external environmental information, personalized motion, voice, or atmosphere feedback may be provided according to the user's real-time needs, so that the immersion and realism of the user experience are significantly improved.

The method for interactive controlling on adult product based on a multimodal model according to the embodiments of the present disclosure provides security in system with security guarantees such as multi-factor authentication, data encryption, and abnormal instruction detection mechanisms, so that the security of user data and the device control process may be ensured to further improve user trust.

Specifically, the functional units implement the following functions:

The speech understanding unit is configured to analyze and understand the semantic features of the text in the user's information.

The voice emotion recognition unit is configured to analyze emotional features of a voice in the user's information.

The facial expression recognition unit is configured to analyze semantic features of facial expressions in an image of the user's information.

The motion recognition unit is configured to understand semantics of body movements in the user's information.

The context understanding unit is configured to construct a semantic understanding framework by combining historical interaction information and current dialogue content.

The multimodal semantic fusion unit is configured to integrate the semantic analyzing results of the functional units to generate unified semantic understanding, when two or more of the above functional units are included.

In the above embodiments, the language understanding unit may employ various natural language processing (NLP) techniques, such as pre-trained deep learning models, to parse and understand the semantic features of the text in user's information based on sentence structure, semantic analysis, etc.

In the above embodiments, the voice emotion recognition unit may extract voice-related features and speech-related features. Voice-related features may include fundamental frequency and energy. Fundamental frequency reflects a frequency of the pitch in a speech signal and is related to the speaker's pitch. Energy reflects an intensity of a speech signal and is related to the speaker's volume and emotional state. Speech-related features may include speech speed, intonation, and spectral features. Speech speed reflects a speed of speech, which is related to the emotional state. Intonation reflects changes in pitch in a speech signal and is closely related to the emotional state. Spectral features reflect distribution characteristics of a speech signal on the spectrum and are related to pronunciation habits and emotional state. With these features and further extracted by using machine learning or deep learning techniques to be used in training an emotion recognition model (neural network), analyzing may be conducted on the emotional features of the voice in the user's information.

In the above embodiments, the facial expression recognition unit generally first detects a face in an image and then extracts key feature information of the face, such as shape, size, and position of eyes, mouth, eyebrows, etc. The way for extracting features may include geometry-based extraction and deep learning-based extraction (such as CNN). Classification and recognition on expressions may be implemented based on detected key feature information. Common classifiers may include SVM (support vector machines), decision trees, neural networks, and deep learning models. Of course, before being used for classification, the model may be trained and tested using image datasets with known expression labels to train the classifier and verify its accuracy and robustness by using test sets. Test images may be directly input into pre-trained models to obtain expression classification results, so as to complete the analysis on the semantic features of facial expressions in user's information.

In the above embodiments, the motion recognition unit, similar to the above units, may obtain user images and achieve motion recognition using pre-trained motion recognition models or keypoint detection means. Motion recognition may be further conducted by using data or information obtained from sensing devices. For example, for users of adult products, wearable devices (such as wristbands) or other sensing devices (such as three-axis or six-axis sensors) may conduct detection to determine the speed, direction, and force magnitude of the user's body movements. Based on the results of motion recognition, the semantics of body movements in the user's information may be determined.

In the above embodiments, the context understanding unit may process historical interaction information and current dialogue content, which may include voice, text, or image information. With analyzing conducted on the semantic relationships between words (such as synonyms, antonyms, hypernyms, and hyponyms) and the logical relationships between sentences (such as causal, adversative, and other relationships), and incorporating contextual information, a semantic understanding framework may be constructed so that the current dialogue content may be determined more accurately to generate context semantics. Furthermore, the semantic understanding framework may be continuously optimized and adjusted by accumulating historical interaction information and learning different user habits and preferences, so as to provide a better understanding framework for subsequent user intent recognition.

It can be understood that the context understanding unit may integrate historical interaction information and current dialogue content, analyze semantic relationships and logical structures, and generate contextual semantic features that reflect the user's current intent and historical behavior. These semantic features have stronger contextual relevance and dynamic adaptability.

In the case that two or more of the above units are used, the multimodal semantic fusion unit integrates semantic analyzing results therefrom to generate unified semantic understanding. That is, the multimodal semantic fusion unit combines the semantic analyzing results from different sources or modes (such as voice, text, image, body movements, and external environmental information) to obtain a richer and more comprehensive unified semantic understanding. For example, the multimodal semantic fusion unit may use deep learning models to achieve feature-level fusion by using shared layers or joint training. Alternatively, each modal may independently make predictions, whose results may be combined at the decision stage. A multimodal neural network architecture may be constructed, with additional layers responsible for cross-modal feature fusion, and unified semantic understanding may be finally obtained.

According to the technical idea for the method for interactive controlling on adult product based on a multimodal model described above, another embodiment of the present disclosure may further provide a device for interactive controlling on adult product based on a multimodal model, including:

a multimodal perception module configured to acquire perception data of a user interacting with the adult product, and the perception data of the user includes one or more modal data of voice data and tactile data;

a multimodal emotion recognition module configured to conduct feature-extracting on each modal data in the perception data to obtain modal feature vectors corresponding thereto;

a multimodal fusion module configured to conduct conducting search in a data structure of action parameter vectors according to the emotion class of the user, to determine a control instruction for the adult product;

an instruction generation module configured to conduct search in a data structure of action parameter vectors according to the emotion class of the user, to determine a control instruction for the adult product;

a control signal generation module configured to convert the control instruction into drive signals for the adult product, so that the adult product performs actions corresponding to the drive signals.

In some embodiments of the present disclosure, the multimodal perception module may obtain various types of information through one or more interfaces. Some of the obtained information may be subjected to preprocessing (such as preliminary data formatting, noise reduction, etc.), before being transmitted to the multimodal emotion recognition module. Furthermore, perception data may be collected by corresponding sensors or devices (such as microphones, cameras, tactile force feedback devices, etc.) and may be obtained in a wired or wireless way.

In some embodiments, more particularly, the multimodal emotion recognition module extracts feature vectors (such as voice emotion features, text semantic features, facial expression features, etc.) and performs emotion recognition on each type of features.

In the device according to embodiments of the present disclosure, the instruction generation module is further configured to generate a control instruction according to the emotion class, wherein the control instruction is configured to change one or more of a movement mode, an intensity, or a frequency in which the adult product is operating. The control instruction is represented as an action parameter vector A=[a1, a2, . . . , an], where each of the components a1, a2, . . . , an represents an independent physical control dimension for the adult product. The physical control dimension may include one or more of the following: vibration frequency, vibration intensity, contraction frequency, contraction intensity, swing amplitude, swing speed, temperature change amplitude, and pressure intensity of tactile feedback. A range of parameters of the physical control dimension corresponds to a preset set of movement patterns.

In the device according to embodiments of the present disclosure, the control instruction further includes one or more of the following:

voice control instruction, configured to make selection among preset voice feedback templates and adjust voice parameters according to the emotion class.

atmosphere control instruction, configured to change one or more of brightness of a light source, color of a light source, flicker frequency of the light source, background music, based on the emotion class of the user.

The device according to embodiments of the present disclosure further includes:

an encryption module configured to perform multi-factor authentication and authorization management on user identity to ensure that only authorized users can control the current adult product; encrypt user data in a way of end-to-end to prevent unauthorized access and data leaks; monitor an execution process of the control instructions to block abnormal instructions to ensure safe use.

The device according to embodiments of the present disclosure further includes:

a remote update module configured to download and install a latest multimodal model parameters or control logic through a network connection or from a cloud platform, where the update process uses digital signatures and verification mechanisms to ensure the authenticity and integrity of the updated content.

Embodiment 1: The user is male, and the adult product is a smart silicone doll

User behavior: The user says to the smart silicone doll, "You look beautiful today", while touching the doll's cheek gently and slowly.

Emotion recognition: four input signals may be processed by the multimodal Transformer model: voice content (converted into text via speech recognition), voice acoustic features (such as fundamental frequency, energy, rhythm, etc.), touch pressure data (collected through a pressure sensor array), and touch speed/trajectory data (obtained in real-time by capacitive sensors). Each modal data is first processed by an independent feature extractor and then fused across modalities by using a self-attention mechanism to capture correlations between different signals. The model adopts a pretraining-finetuning paradigm to be pretrained on large-scale emotional interaction data and then finetuned for specific scenarios. Confidence scores may be dynamically adjusted based on historical interactions by using an adaptive threshold mechanism.

The model ultimately outputs an emotion class of "gentle/intimate," with a confidence score of 85%, along with the analyzing results for emotional intensity and temporal trends.

Response Made by the Doll:

The doll's facial expression changes to a smile, and its eyes perform a slow blinking motion.

The facial area lightly heats up, while simulating a blushing reaction.

The doll responds by using its built-in speaker: "Thank you, I think you look especially charming today" with a soft tone of voice.

The doll's body posture changes to gently lean toward the user.

Additional Feedback (Optional):

The ambient lighting around the doll automatically dims to create a romantic atmosphere.

A notification is displayed on the mobile application indicating that "Intimacy Mode has been activated," while playing soft music as background music.

The system records this interaction data for future optimization for response patterns.

Embodiment 2: The User is Female, and the Adult Product is a Smart Massager

User behavior: During use, the user softly says, "Can you go faster," or makes weak vocalizations such as moaning, while slightly accelerating the movement of the massager by her wrist.

Emotion recognition: The multimodal Transformer architecture employs a specially enhanced processing flow designed for low signal-to-noise ratio environments. The voice processing branch uses an acoustic model specifically trained for weak sounds and non-verbal vocalizations (such as moaning and panting) by self-supervised learning means to extract feature patterns from large-scale contextual audio. The model employs a specialized attention mechanism capable of capturing subtle sound variations below 20 dB in noisy environments, with spectral enhancement techniques to amplify critical frequency bands.

High-precision millimeter-wave sensor array capable of recognizing subtle acceleration changes as low as 0.2 $mm/s^2$ may be used for the motion recognition branch, combined with pressure sensors to capture slight pressure changes in the range of 1-5 g. A temporal Transformer employs a sliding window technique to perform cumulative analysis on micro-movements over the past 30 seconds, to recognize potential rhythm change trends.

The two modalities are integrated by using a confidence-weighted fusion mechanism. When one modal signal is weak, the system automatically increases the weight of the other modal. The system ultimately accurately identifies the "excited/anticipating enhancement" state from extremely subtle moaning and movements, of hands, with a confidence level of 93%, and provides sensitivity adjustment options to allow the system to dynamically adjust recognition thresholds based on the usage scenario.

Adjustments to Massager:

The vibration frequency gradually increases from the 65 Hz to 90 Hz.

The amplitude and intensity gradually increase from 60% to 75%.

The vibration mode transitions from steady mode to a wave-like fluctuation mode.

Adjusting Process:

The frequency is increased by 15 Hz within the first 3 seconds.

The frequency and amplitude may be changed periodically in a wave-like curve during the next 5 seconds.

Fine-tuning is performed every 20 seconds, based on the user's reactions (voice, motion frequency) to optimize vibration parameters automatically.

Keeping monitoring the user's reactions, and when changes in the user's voice or movements are detected, the parameters are automatically adjusted to match emotional changes.

Feedbacks Along with the Adjustments (Optional):

The massager's temperature gradually increases by 2° C. above body temperature.

A notification tone and voice message may be made by a smartphone connected with the massager: "Enhancement Mode activated".

A smart lighting system connected with the massager changes brightness rhythmically in sync with the vibration frequency.

An App records preference data during the using of the massager for personalized recommendations in future.

The embodiments of the present disclosure further provide an adult product based on a multimodal model, including: a housing, a primary control component, a driving component, an execution component and an information acquisition component provided in or on the housing;

the information acquisition component includes at least one microphone and at least one sensor, the sensor includes at least one pressure sensor; the information acquisition is configured to acquire perception data of a user interacting with the adult product, wherein the perception data of the user includes one or more modal data of voice data and tactile data;

the primary control component is configured to process the perception data of the user by running a multimodal neural network model, the processing the perception data of the user includes: extracting voice feature vector from the voice data, and extracting tactile feature vector from a tactile data; applying an attention mechanism to the voice feature vector and the tactile feature vector to obtain modal weights by calculation and generate a weighted cross-modal feature representation that quantifies an emotional state of the user; mapping the weighted cross-modal feature representation to a specific emotion class of the user selected from a predefined set of emotion classes; conducting search in a data structure of action parameter vectors to generate a multi-component action parameter vector, A=[a1, a2, . . . , an], wherein the data structure of action parameter vectors stores predefined action parameter vectors for each emotion class in the predefined set as a response to the specific emotion class of the user; each component of the action parameter vector under searching represents a specific numerical control value for an independent physical control dimension of the adult product, the physical control dimensions including at least vibration frequency and contraction intensity;

the driving component is configured to convert the numerical control values of the action parameter vector under searching into drive signals;

the execution component is configured to performs physical actions defined by the numerical control values.

The drive signals generated in the embodiments of the present disclosure match the model of the execution component used. When control instructions are converted into drive signals, the command set adapted to the model of the execution component is used, and the drive signals are generated according to the gear levels and operating modes supported by the model of the execution component. In embodiments, the gear levels and operating modes supported by different motors may vary. For example, motor a supports three levels of speed, while motor b supports five levels of speed. When drive signals for motor a and motor b are generated, the conversion is performed in a nearest-match manner to the level of speed supported by motor a and motor b, respectively.

Alternatively, the sensors include: a camera, a temperature sensor, a light sensor, and a sound sensor.

Alternatively, the driving component includes one or more of a motor, a servo motor, a pneumatic element, and a hydraulic element.

Alternatively, the execution component includes one or more of a microphone, a switch, a heater, a linear actuator, and a rotary actuator.

Embodiment 3: The User is Male, and the Adult Product is a Smart Silicone Doll or a Device with a Similar Function Pressure sensors are provided on chest and other locations of the smart silicone doll. Temperature sensors are provided on the genital area and other locations of the smart silicone doll. Other types of sensors, such as cameras, light sensors, or sound sensors, are provided in positions as needed on the smart silicone doll. A smart terminal may be used as a camera, light sensor, or sound sensor.

Rotary actuators and linear actuators are provided at each joint and movable part of the smart silicone doll. Each actuator is connected to a motor or driving component, and a clamping mechanism is provided in the genital area.

The main control component conducts analyzing on one or more types of collected perception data and determines control instructions according to the above method, so as to control one or more of eyes, mouth, head, shoulders, elbows, wrists, hips, knees, ankles, genitals, and buttocks to perform corresponding actions. These actions are combined with heating, voice, and other feedback to achieve intelligent interaction between the adult product and the user.

Specifically, when the eyes, mouth, head, shoulders, elbows, wrists, hips, knees, ankles, genitals, and buttocks perform actions, the amplitude or intensity of the actions may be set to several states. The number of states set for each part may be the same or different. For example, the eyes may be set to two states: open and closed. The head may be set to nine states: looking forward, turning 100 to the left, turning 20° to the left, turning 30° to the left, turning 40° to the left, turning 100 to the right, turning 200 to the right, turning 300 to the right, and turning 400 to the right. The state settings for each part may be as shown in Table 1:

Movements of arms may be controlled by controlling states of the shoulders, elbows, and wrist, so as to hug the user and may be further controlled to control the strength of the hug.

Movements of legs may be controlled to bend by controlling states of the hips, knees, and ankles, and may be further controlled to control the degree of bending.

The genital may be controlled to be tight by controlling action thereof, and may be further controlled to control frequency and intensity of tightening.

The buttocks may be controlled to swing by controlling action thereof, and may be further controlled to control the amplitude and speed of swinging.

Embodiment 4: The User is Female, and the Adult Product is a Male Doll, a Massager, or a Device with a Similar Function Pressure sensors are provided on the genital area and other parts of the smart male doll. Temperature sensors are provided on the genital area and other parts of the smart male doll. Other types of sensors, such as cameras, light sensors, or sound sensors, are provided as needed on the smart male doll. A smart terminal may be alternatively used as a camera, light sensor, or sound sensor.

Rotary actuators and linear actuators are provided at each joint and movable part of the smart male doll. Each actuator is connected to a motor or driving component, and a vibration mechanism is provided in the genital area.

The main control component conducts analyzing on one or more types of collected perception data and determines control instructions according to the above method, so as to control one or more of eyes, mouth, head, shoulders, elbows, wrists, hips, knees, ankles, genitals, and buttocks to perform

TABLE 1

| part | state 1 | state 2 | state 3 | state 4 | state 5 | state 6 | state 7 | state 8 | state 9 |
|---|---|---|---|---|---|---|---|---|---|
| eyes | Open | Squint | Closed | | | | | | |
| Mouth | Fully Open | Open Level 1 | Open Level 2 | Open Level 3 | Closed | | | | |
| Head | Looking-Forward | Turning-Left 1 | Turn-Left Level 2 | Turn-Left Level 3 | Turn-Left Level 4 | Turn-Right Level 1 | Turn-Right Level 2 | Turn-Right Level 3 | Turn-Right Level 4 |
| Shoulder | Dropped | UP Level 1 | UP Level 2 | UP Level 3 | UP Level 4 | UP Level 5 | UP Level 6 | UP Level 7 | Fully UP |
| Elbow | Straight | Bent Level 1 | Bent Level 2 | Bent Level 3 | Bent Level 4 | Bent Level 5 | Bent Level 6 | Bent Level 7 | Bent Level 8 |
| Wrist | Straight | Bent Level 1 | Bent Level 2 | Bent Level 3 | Bent Level 4 | Bent Level 5 | Bent Level 6 | Bent Level 7 | Bent Level 8 |
| Hips (Open) | Open Level 1 | Open Level 2 | Open Level 3 | Open Level 4 | Open Level 5 | Open Level 6 | Open Level 7 | Open Level 8 | Open Level 9 |
| Hips (Bent) | Straight | Bent Level 1 | Bent Level 2 | Bent Level 3 | Bent Level 4 | Bent Level 5 | Bent Level 6 | Bent Level 7 | Bent Level 8 |
| Knees | Straight | Bent Level 1 | Bent Level 2 | Bent Level 3 | Bent Level 4 | Bent Level 5 | Bent Level 6 | Bent Level 7 | Bent Level 8 |
| Ankles | Straight | Bent Level 1 | Bent Level 2 | Bent Level 3 | Bent Level 4 | Bent Level 5 | Bent Level 6 | Bent Level 7 | Bent Level 8 |
| Genitals (Frequency) | A1 times/min | A2 times/min | A3 times/min | A4 times/min | A5 times/min | A6 times/min | A7 times/min | | |
| Genitals (Amplitude) | Level 1 | Level 2 | Level 3 | Level 4 | Level 5 | Level 6 | Level 7 | Level 8 | Level 9 |
| Buttocks (Amplitude) | Amplitude 1 | Amplitude 2 | Amplitude 3 | Amplitude 4 | Amplitude 5 | Amplitude 6 | Amplitude 7 | Amplitude 8 | Amplitude 9 |
| Buttocks (Frequency) | B1 times/min | B2 times/min | B3 times/min | B4 times/min | B5 times/min | B6 times/min | B7 times/min | | |
| . . . | | | | | | | | | |

corresponding actions. These actions are combined with heating, voice, and other feedback to conduct intelligent interaction between the adult product and the user.

More particularly, when the eyes, mouth, head, shoulders, elbows, wrists, hips, knees, ankles, genitals, and buttocks perform actions, the amplitude or intensity of the actions may be provided with several states. The state for each part may be as shown in Table 2.

TABLE 2

| part | state 1 | state 2 | state 3 | state 4 | state 5 | state 6 | state 7 | state 8 | state 9 |
|---|---|---|---|---|---|---|---|---|---|
| eyes | Open | Squint | Closed | | | | | | |
| Mouth | Fully Open | Open Level 1 | Open Level 2 | Open Level 3 | Closed | | | | |
| Head | Looking-Forward | Turning-Left 1 | Turn-Left Level 2 | Turn-Left Level 3 | Turn-Left Level 4 | Turn-Right Level 1 | Turn-Right Level 2 | Turn-Right Level 3 | Turn-Right Level 4 |
| Shoulder | Dropped | UP Level 1 | UP Level 2 | UP Level 3 | UP Level 4 | UP Level 5 | UP Level 6 | UP Level 7 | Fully UP |
| Elbow | Straight | Bent Level 1 | Bent Level 2 | Bent Level 3 | Bent Level 4 | Bent Level 5 | Bent Level 6 | Bent Level 7 | Bent Level 8 |
| Wrist | Straight | Bent Level 1 | Bent Level 2 | Bent Level 3 | Bent Level 4 | Bent Level 5 | Bent Level 6 | Bent Level 7 | Bent Level 8 |
| Hips (Open) | Open Level 1 | Open Level 2 | Open Level 3 | Open Level 4 | Open Level 5 | Open Level 6 | Open Level 7 | Open Level 8 | Open Level 9 |
| Hips (Bent) | Straight | Bent Level 1 | Bent Level 2 | Bent Level 3 | Bent Level 4 | Bent Level 5 | Bent Level 6 | Bent Level 7 | Bent Level 8 |
| Knees | Straight | Bent Level 1 | Bent Level 2 | Bent Level 3 | Bent Level 4 | Bent Level 5 | Bent Level 6 | Bent Level 7 | Bent Level 8 |
| Ankles | Straight | Bent Level 1 | Bent Level 2 | Bent Level 3 | Bent Level 4 | Bent Level 5 | Bent Level 6 | Bent Level 7 | Bent Level 8 |
| Genitals (Frequency) | A1 times/min | A2 times/min | A3 times/min | A4 times/min | A5 times/min | A6 times/min | A7 times/min | | |
| Genitals (Amplitude) | Level 1 | Level 2 | Level 3 | Level 4 | Level 5 | Level 6 | Level 7 | Level 8 | Level 9 |
| Buttocks (Amplitude) | Amplitude 1 | Amplitude 2 | Amplitude 3 | Amplitude 4 | Amplitude 5 | Amplitude 6 | Amplitude 7 | Amplitude 8 | Amplitude 9 |
| Buttocks (Frequency) | B1 times/min | B2 times/min | B3 times/min | B4 times/min | B5 times/min | B6 times/min | B7 times/min | | |
| . . . | | | | | | | | | |

Movements of arms may be controlled by controlling states of the shoulders, elbows, and wrist, so as to hug the user and may be further controlled to control the strength of the hug.

Movements of legs may be controlled to bend by controlling states of the hips, knees, and ankles, and may be further controlled to control the degree of bending.

The genital may be controlled to be tight by controlling action thereof, and may be further controlled to control frequency and intensity of tightening.

The buttocks may be controlled to swing by controlling action thereof, and may be further controlled to control the amplitude and speed of swinging.

Specifically, the present embodiment may include the following.

System Architecture

A system may be embedded into adult products, and may process a plurality of input data, such as speech, contact force, and vision, and conduct emotion recognition and feedback by using deep learning means.

Multimodal Perception Module

The system collects the following input data:

1. Voice data: voice content and acoustic features are collected through a microphone array.
2. Tactile data: contact force, speed, and trajectory are obtained through a pressure sensor array.
3. Visual data (optional): facial expressions and body movements are captured through a camera.

Algorithm for Multimodal Emotion Recognition

1. Feature Extraction Layer

Dedicated Feature Extraction Sub-Networks are Configured for Input Data of Each Modal:

Voice content feature extraction: A Chinese pre-trained language model (such as the BERT model) is used to process voice text obtained by conversion and extract semantic representations. With analyzing on emotional lexicon features and semantic dependency, the recognition on emotional words and relationships may be improved.

Field adaptation training is conducted for specific vocabulary and expressions in the adult filed.

Voice acoustic feature extraction: Mel-frequency cepstral coefficients (MFCC) are used to extract basic acoustic features. Spectral analysis is employed to extract fundamental frequency, energy, harmonic-to-noise ratio, and other acoustic features. High-dimensional voice representations are extracted by using a self-supervised pre-trained speech encoder (such as a variant of wav2vec 2.0). Spectral enhancement techniques are used in low signal-to-noise ratio environments to improve the capture of signals below 20 dB.

Tactile feature extraction: A multilayer perceptron network is used to process touch and pressure sensor data to extract touch patterns, force, and rhythm features. Nonlinear transformations map raw tactile signals into emotion-related feature spaces. Pressure time-series features are collected in a range of 1-500 g with a sampling rate of 100 Hz. Touch trajectory features are extracted using a spatiotemporal convolutional network. Touch area distribution is obtained through a pressure sensor array to generate a contact area heat map. Action frequency features are extracted by using FFT analysis to identify periodic characteristics.

Visual feature extraction (if applicable): Facial expression features are extracted based on an improved FaceNet to obtain features of 68 key points. Eye contact features are determined by using a pupil tracking algorithm to determine gaze duration and frequency. Body posture features are extracted using a lightweight human pose estimation model to identify key points.

2. Multimodal Fusion Layer a Multimodal Transformer Architecture is Used for Interaction and Fusion Between Modalities:

Feature mapping: Features of each modal are projected into same dimensional feature space by using linear mapping to create a unified representation basis.

Multi-head attention mechanism: A self-attention mechanism may be used for various modalities to focus on and learn from each other. For example, there may be a correlation between voice intonation and touch force, which can be captured by using the attention mechanism.

Modal interaction: Information exchange and complementation between modalities are adopted. When one modal signal is unclear, supplementary information may be obtained from other modalities. For example, when the voice signal is weak, the system pays more attention on changes in tactile signals.

Residual connections and layer normalization: Effective information transmission may be implemented in deep networks by using residual connections and layer normalization, so as to avoid gradient vanishing problems, and maintain numerical stability.

3. Emotion Classification and Confidence Evaluation

Emotion State Recognition is Performed Based on the Fused Representation:

Emotion classifier: A multilayer feedforward neural network is used to map the fused features to the probability distribution of different emotion class. A specific emotion class system is defined for adult product scenarios, including specific emotional states such as "gentle/intimate" and "excited/anticipating enhancement."

Confidence estimator: An independent neural network branch may be used to evaluate reliability of emotion recognition results. When an input data has much noise or is ambiguous, a lower confidence score is output.

Emotion intensity estimator: Evaluation may be conducted on intensity of the emotion to output a value between 0 and 1 to represent the strength of the emotion.

Intensity information is used to adjust the amplitude of device in response.

4. Adaptive Threshold Mechanism

The Recognition Threshold is Dynamically Adjusted for Different Users and Scenarios:

History data accumulation: Confidence scores from the most recent 10 interactions are recorded to establish an adjustment basis. The system pays attention on the user's interaction patterns in history to be adapted to individual usage habits.

Threshold adaptive adjustment: Based on history confidence and user's potential feedback, decision thresholds are dynamically adjusted. For example, when the system repeatedly has high confidence, the threshold may be lowered appropriately to respond more actively.

Feedback integration: Explicit and implicit feedback from the user is integrated into threshold adjustments. The system identifies the user's satisfaction with responses and adjusts future judgment criteria accordingly.

5. Temporal Analyzing Module

The Temporal Patterns of Emotional Changes are Analyzed:

Sequence processing: A long short-term memory network (LSTM) is used to process time-series features, to capture dynamic changes in emotional states. The memory mechanism of LSTM allows the system to "remember" long-term interaction history and identify emotional development trends.

Attention mechanism: Attention weights focus on key time points in a sequence to identify critical moments of emotional transition. For example, when a user suddenly changes from a calm state to excitement, the system may capture this transition point.

Trend analyzing: The emotional development trend (rising, stable, or declining) may be predicted to assist the device in making forward-looking adjustments. Trend information is used to generate more coherent and natural device response sequences.

6. Processing on Missed Modal

When the system receives a plurality of modalities of data (such as voice, touch, and vision), a quality of each modal's data may be different from each other. For example, quality of voice signal may degrade in noisy environments, or visual signals may become unreliable due to insufficient lighting. This mechanism for processing missed modal may improve the robustness of system decisions by evaluating the reliability of each modal and dynamically adjusting its weight.

Modal Reliability Evaluation $$r\_m = f(\text{SNR}\_m, \text{variance}\_m, \text{historical\_performance}\_m)$$

In this step, the reliability score r_m for each modal m is determined, which is a comprehensive score configured to determine the reliability of the information provided by the current modal m. The higher the score, the more trustworthy the modal's information. The following factors may be fully evaluated by function f.

SNR_m: Signal-to-noise ratio, which is the ratio of valid information to noise in the signal. For example, the signal-to-noise ratio of the voice modal may reach over 30 dB in a quiet environment but may drop to as low as 5 dB in a noisy environment.

variance_m: The variance of internal features within the modal, and reflects the richness and consistency of the information. High variance may indicate rich information or severe noise.

history_performance_m: The performance record of the modal in historical interactions, recent accuracy rates may be determined in a sliding window.

The function f may be implemented as a weighted sum or a more complex nonlinear function as follows:

$$r\_m = \alpha \cdot \text{normalized}(\text{SNR}\_m) + \beta \cdot \text{quality\_score}(\text{variance}\_m) + \gamma \cdot \text{historical\_performance}\_m$$

wherein SNR_m (Signal-to-Noise Ratio): Signal-to-noise ratio, which is a ratio of the strength of the useful signal to the strength of background noise. Generally, the higher the signal-to-noise ratio, the better the signal quality and the more reliable the data.

normalized( . . . ): Normalization processing. Since the signal-to-noise ratios of different modalities may have different dimensions or numerical ranges, normalization may unify them into a comparable range (e.g., between 0 and 1), so as to facilitate subsequent weighted summation.

variance_m: Variance of the $m^{th}$ modal data. Variance may show a volatility or uncertainty of the data. In some cases, smaller variance may indicate more stable and consistent data with higher quality; however, in other cases, an appropriate level of variance may be normal.

quality_score( . . . ): This is a function that provides a quality score based on the variance variance_m. The specific form of this function may depend on the application scenario. For example, smaller variance may correspond to a higher quality score, or there may be an optimal range of variance.

historical_performance_m: This refers to a performance of the modal in past tasks or data processing. For example, if a sensor has consistently been accurate in the past, its historical performance score will be relatively high.

$\alpha$, $\beta$, and $\gamma$ are weighting coefficients that are adjustable according to the application scenario.

Dynamic Weight Allocation $$w\_m=\text{softmax}(r\_m)$$

The reliability scores of each modal are converted into a weight distribution by using the softmax function, so that the sum of all weights is 1:

$$w\_m=\exp(r\_m)/\Sigma\_i\ \exp(r\_i)$$

Such conversion is conducted, so that:

modals with high reliability have greater weight.

All modal weights are within a range of 0 to 1, and sum thereof is 1.

When the reliability of a modal is significantly higher than others, its weight approaches 1.

For example, if the reliability scores for the tactile, voice, and visual modals are 0.8, 0.3, and 0.2 respectively, after the conversion of softmax, the tactile modal's weight is approximately 0.65, which is much higher than the others.

Weighted Feature Fusion $$X\_\text{fused}=\Sigma(w\_m\cdot X\_m)$$

At last, the system fuses features from each modal through weighted summation:

X_m is a feature vector of modal m.

w_m is a weight of the modal.

X_fused is a fused feature vector.

With the technical solution as stated above, when certain modal signals are weak or missing, the system may rely on information from other reliable modals more. For example, in a dark environment where the visual modal is almost ineffective (weight close to 0), the system will primarily rely on tactile and voice modals.

In embodiments, the system may determine the reliability of each modal in real-time and dynamically adjusts the fusion weights to adapt to changes in modal quality under different environmental conditions, so that the robustness and adaptability of the system in complex environments may be improved.

System Training and Optimization

1. Data Collection and Preparation

To train an effective multimodal emotion recognition model, it is necessary to collect multimodal data in specific scenarios.

- Data sources: Real interaction data is collected in an ethically compliant manner, or simulated datasets are established based on professional knowledge. All data collection activities comply with strict ethical standards and privacy protection measures.
- Data organization: A structured dataset containing multimodal information such as voice, touch, and vision is established, so that the data from different modalities may be synchronized in terms of time. Data annotations include emotion classes, emotion intensity, and temporal development trends.
- Preprocessing on Data: Raw data is cleaned, denoised, and normalized to ensure training quality. It is necessary for voice data to reduce environmental noise, and for tactile data to filter out noise caused by sensor jitter.

2. Strategy for Training Model

A two-stage training strategy is adopted to improve model performance.

Pre-training stage: Pre-training is conducted on large-scale general emotion datasets to learn capabilities for fundamental emotional representation. These general datasets include open multimodal emotion databases, such as the CASIA dataset (voice emotion) and the NLPCC dataset (text emotion).

Fine-tuning stage: Fine-tuning is conducted on datasets specific to the target scenario to adapt to the emotional expression patterns of interactions in specific adult product scenarios. During fine-tuning, a smaller learning rate is used to retain the general knowledge obtained during pre-training while adapting to the characteristics of the specific scenario.

Multi-task learning: A plurality of tasks related to each other for training on e.g., emotion classification, confidence estimation, and intensity prediction may be conducted simultaneously to improve the model's overall performance. Multi-task learning enables the model to better understand the multidimensional nature of emotions.

3. Loss Function

A composite loss function is configured to optimize multiple objectives.

Emotion classification loss: Cross-entropy loss is used to optimize the accuracy in recognizing emotion class. For imbalanced distribution of emotion class, weighted cross-entropy is adopted to ensure good performance for minority classes.

Confidence estimation loss: Mean squared error loss is used to optimize the accuracy in predicting confidence, so that the model outputs low confidence in uncertain situations to avoid incorrect decisions.

Intensity estimation loss: Mean squared error loss is used to optimize the accuracy in predicting emotion intensity. Intensity prediction is crucial for controlling the amplitude of device responses.

Temporal trend loss: Cross-entropy loss is used to optimize the accuracy in classifying emotion change trends.

Weight balancing: Adjustable weight coefficients are used to balance the contributions of different loss components, to form a final multi-task loss function. The weight coefficients may be adjusted according to the requirements of specific application scenarios.

4. Model Evaluation and Optimization

The model's performance is comprehensively evaluated by using multiple metrics.

Classification accuracy: Evaluation is conducted on overall accuracy in classifying emotions.

Class F1 score: Evaluation is conducted on the balance between precision and recall rate for each emotion class.

Confidence calibration: Evaluation is conducted on a consistency between confidence prediction and actual accuracy.

Temporal consistency: Evaluation is conducted on a smoothness and coherence of emotion predictions over time.

Model Optimization is Conducted Based on Evaluation Results:

Hyperparameter tuning: Hyperparameters such as network structure, learning rate, and regularization strength may be optimized.

Model compression: Model size may be reduced by using techniques such as knowledge distillation and quantization to meet the resource constraints of embedded devices.

Feature engineering: Analyzing is conducted on importance of different modal features so as to determine the most effective feature combinations.

Control Signal Generation Module

1. Action Parameter Vector Space

The action parameter vector A defines various physical dimensions controllable by the device, to form a multidimensional control space. These parameters work together to create coordinated responses that match emotional states.

$$A=[a1,a2, \ldots ,an]$$

Each Component Represents an Independent Physical Control Dimension:

Vibration frequency (15-200 Hz): the oscillation rate of the vibration unit. Low frequencies (15-40 Hz) mean a deep sensation, while high frequencies (100-200 Hz) means sharp stimulation.

Vibration intensity (0-100%): the vibration amplitude, which may be controlled to affect perceived intensity.

Contraction frequency (0-60 times/min): periodic motion frequency of the contraction unit.

Contraction intensity (0-100%): pressure level of the contraction unit.

Swing amplitude (0-100%): angular range of device swinging.

Swing speed (0-100 the angular velocity of device swinging.

Temperature variation (±5° C.): deviation of surface temperature relative to the baseline temperature.

Tactile feedback (0-100%): pressure intensity of the tactile feedback unit.

There is physical limit and valid range for each parameter for safety. The system automatically ensures that all parameters remain within these limits while optimizing the perceived experience.

2. Emotion-Action Mapping Algorithm 2.1 Mapping Function Based on Emotion Vectors The emotion vector E contains intensity values for multiple emotional dimensions, such as:

$$E=[e1,e2, \ldots ,em]$$

For example: E=[e_arousal, e_pleasure, e_dominance, e_intimacy, e_excitement]

wherein, e_arousal, e_pleasure, e_dominance, e_intimacy, and e_excitement represent intensities of various emotional dimensions, typically within a range [0,1].

The emotion vector is converted into action parameters by using a mapping matrix M:

$$A=f(M\cdot E+b)$$

Where: M is an m×n mapping matrix that defines the relationship between emotions and actions.

b is the baseline action bias vector, defining default behavior when there is no significant emotion input.

f is a nonlinear activation function, configured to limit the output to be within a reasonable range by using functions of sigmoid or tanh For example, if the system obtains an emotion vector E=[0.8, 0.6, 0.3, 0.7, 0.9] during detection, which indicates a state of high arousal, medium-high pleasure, low dominance, high intimacy, and high excitement, the action parameters A=[110 Hz, 75%, 35 times/min, 65%, 40%, 60%, +2.5° C., 50%] may be generated by calculation of mapping, to instruct the device to produce corresponding physical responses.

2. Optimization of the Mapping Matrix

The mapping matrix M is not fixed but may be continuously optimized in many ways.

Initial setup: An initial emotion-physiological response relationships may be established based on psychological and physiological research. For example, excitement is associated with rapid heartbeat and increased body temperature, and thus may be related to higher vibration frequencies and temperatures.

User feedback optimization: User satisfaction feedback is collected to construct an optimization objective function:

$$J(M)=-\Sigma(\text{satisfaction\_}i)+\lambda\|M\|^2$$

where satisfaction_i is a score of user satisfaction for the i-th interaction, and $\lambda|M\|^2$ is a regularization term to prevent overfitting.

The mapping matrix is optimized by using gradient descent:

$$M\_\text{new}=M\_\text{old}-\eta\cdot\nabla J(M)$$

where η is a learning rate, typically set between 0.01 and 0.05.

∇ is a vector differential operator representing the gradient.

Personalization adjustment: A user-specific vector P is introduced to adjust the mapping relationship:

$$A=f(M\cdot E\cdot P+b)$$

where P is a diagonal matrix representing the user's sensitivity to different emotional dimensions. For example, some users may be more sensitive to excitement, and thus P values may be set to be larger correspondingly.

3. Temporal Dynamic Control Mechanism 3.1 Smooth Transition Algorithm

To prevent discomfort caused by abrupt changes in action parameters, the system employs exponential moving average for smooth transitions:

$$A\_t=\alpha\cdot A\_\{t-1\}+(1-\alpha)\cdot A\_\text{target}$$

wherein A_t is an action parameter vector at time t.

A_{t−1} is an action parameter vector at the previous time.

A_target is an target action parameter determined based on the current emotion.

α is a smoothing coefficient that controls the transition speed.

The smoothing coefficient α is adjusted dynamically based on a type of transition.

For excited states requiring rapid responses, a is set to be smaller (0.3-0.5).

For relaxed states requiring gradual transitions, a is set to be larger (0.7-0.9).

For example, when user's emotion changes from a relaxed state (vibration frequency 30 Hz) to an excited state (target frequency 120 Hz), the system may be not changed sharply immediately but performs transition smoothly as follows (α=0.7):

$$t=1\text{: 30 Hz}\rightarrow\text{57 Hz}=0.7\times30+0.3\times120$$

$$t=2\text{: 57 Hz}\rightarrow\text{75.9 Hz}=0.7\times57+0.3\times120$$

$$t=3\text{:75.9 Hz}\rightarrow\text{88.1 Hz}$$

. . . gradually approaching the target value of 120 Hz.

3.2 Rhythm Synchronization Mechanism

For periodic actions (e.g., user touches repeatedly or device vibrates), the system employs a phase-locked loop (PLL) algorithm to achieve synchronization:

3.2.1 Frequency Determining:

The primary frequency f_user may be determined by performing analyzing on user's input signal by using fast Fourier transform (FFT) analysis.

$$f\_\text{user}=\text{argmax}(|\text{FFT}(\text{input\_signal})|)$$

This may refer to the raw data of user's actions received by the system. For instance, if the user repeatedly rubs the electronic skin with force, the input_signal may be a data sequence in which touch pressure or touch position changes over time. If the user shakes the device, the input_signal may be a time sequence of accelerometer readings.

argmax(IFFT(input_signal)|) may determine a frequency with the largest amplitude (intensity) among all frequency components.

3.2.2 Phase Difference Calculation:

$$\Delta\varphi=\varphi\_user-\varphi\_device$$

wherein φ user and φ_device are the phases of the user's actions and the device's actions, respectively.

3.2.3 Frequency Adjustment:

$$f\_device'=f\_device+K\cdot\Delta\varphi$$

wherein K is a proportional coefficient, typically set to 0.1-0.3.

This mechanism ensures that the device's actions may synchronize with the user's actions in rhythm, to improve the coordination of interaction. For example, when the user is found to perform periodic touches at a frequency of 1.2 Hz, the device may automatically adjust its vibration frequency so that each vibration peak aligns with the user's touch actions, so that the user may have a more harmonious interactive experience.

4. Examples of Action Parameters 4.1 Controlling on Vibration

Algorithm for Controlling Frequency $$f\_vibration=f\_base+\beta1\cdot E\_intensity+\beta2\cdot E\_arousal$$

f_vibration is a vibration frequency of the device. f_base is a preset default vibration frequency when there is no significant emotional input or the emotional state is relatively neutral. E_intensity represents the overall intensity of the user's detected emotion. This may be a composite value, e.g., in a range from 0 (no emotion) to 1 (very intense emotion). E_arousal is a dimension of emotion describing the physiological activation level of the emotion, with a range from calm and relaxed to excited and tense.

For example, anger and excitement are high-arousal emotions, while sadness and calmness are low-arousal emotions. This value is typically normalized within a range, such as [0,1] or [−1,1].

β1 and β2 are weight coefficients.

For example, when f_base=30 Hz, β1=50, and β2=70:

in a low-intensity, low-arousal state (E_intensity=0.2, E_arousal=0.1):

f_vibration=30+50×0.2+70×0.1=47 Hz (gentler vibration).

in a high-intensity, high-arousal state (E_intensity=0.8, E_arousal=0.9):

f_vibration=30+50×0.8+70×0.9=103 Hz (strongly excitant vibration).

The vibration frequency of the device is determined by a base frequency Lbase and is adjusted based on the current user's emotion intensity and arousal level. The stronger the emotion or the higher the arousal level (assuming β1 and β2 are positive), the vibration frequency may be increased accordingly, so that the vibration may be felt as being more "urgent" or "energetic." This is a linear model that intuitively maps emotional features to vibration frequencies.

Algorithm for Controlling Intensity:

$$I\_vibration=I\_min+(I\_max-I\_min)\cdot(E\_intensity/E\_max)^\gamma$$

I_vibration is a vibration intensity of the device. I_min is a minimum vibration intensity, and is the lowest vibration intensity that the device may generate or is configured to allow. Even emotion intensity is quite low, the vibration intensity will not fall below this value. I_max is the maximum vibration intensity the device may produce or is configured to allow. E_intensity represents the overall intensity of the user's emotion obtained by detection. E_max is an preset maximum value of emotional intensity configured to normalize the current emotional intensity E_intensity.

γ is a nonlinear exponent adjustment parameter configured to adjust the nonlinear relationship between emotional intensity and vibration intensity.

If γ=1, the mapping is linear: the vibration intensity increases in proportion to the increase in emotion intensity within the range of I_min and I_max.

If γ>1, the mapping curve bends upward (convex function): vibration intensity grows slowly at low emotion intensity and increases sharply at high emotion intensity. This makes vibrations weaker for low-intensity emotions and amplifies vibrations for high-intensity emotions.

If κ<γ<1, the mapping curve bends downward (concave function): vibration intensity grows faster at low emotional intensity and slows down at high emotional intensity, so that noticeable vibrations may be generated for even low-intensity emotions, while the growth of vibration intensity for high-intensity emotions is less dramatic.

When I_min=10%, I_max=100%, E_max=1.0, and γ=2.0:

in moderate emotional intensity (E_intensity=0.5):

I_vibration=10+(100−10)×(0.5/1.0)^2.0=32.5%.

in high emotional intensity (E_intensity=0.9):

I_vibration=10+(100−10)×(0.9/1.0)^2.0=81.1%.

4.2 Controlling on Humanoid Bionic Motion

Controlling on Facial Expression:

Facial motion parameter vectors are determined based on the emotion vector:

$$F=[f\_eye\_blink, f\_mouth\_open, f\ face\_flush, \ldots]$$

Examples

Eye Blinking Frequency:

$$f\_eye\_blink=\max(0.5,\min(5.0,2.0+3.0\cdot E\_arousal))$$

E_arousal is a dimension of emotion.

When E_arousal=0.2, f_eye_blink=2.6 times/minute (relaxed state).

When E_arousal=0.8, f_eye_blink=4.4 times/minute (excited state).

Mouth Opening Degree:

$$f\_mouth\_open=\mathrm{sigmoid}(0.8\cdot E\_arousal+0.5\cdot E\_pleasure-0.3)$$

The sigmoid function (also known as the logistic function) is usually expressed as S(x)=1/(1+e^(−x)), where e is the base of the natural logarithm.

When E_arousal=0.7 and E_pleasure=0.6:

f_mouth_open=sigmoid(0.8×0.7+0.5×0.6−0.3)=sigmoid (0.56+0.3−0.3)=sigmoid(0.56)≈0.64, and in such case, the mouth is in a moderately open state.

Coordination Control for Limb Motion:

A coupled oscillator network is used to realize coordinated motion of multiple joints:

$$\theta\_i(t)=A\_i\cdot\sin(\omega\_i\cdot t+\varphi\_i)+\Sigma j\ K\_ij\ \sin(\theta\_j(t)-\theta\_i(t)-\psi\_ij)$$

θ_i(t) is a phase (or angle) of the i-th oscillator at time t. θ_j(t) is a phase (or angle) of the j-th oscillator at time t. ψ_ij is a constant parameter that defines the phase relationship between oscillator i and oscillator j as desired.

A natural and coordinated limb motion patterns may be generated by using this algorithm.

For example, when a state "gentle stroking" is simulated, the arm and wrist joints move in coordination at a low frequency ($\omega \approx 0.5$ Hz), with a moderate amplitude ($A \approx 30°$), and at a specific phase difference ($\phi \approx 90°$).

When a state "enthusiastic hugging" is simulated, multiple joints coordinate at a medium frequency ($\omega \approx 1.2$ Hz) and at a large amplitude ($A \approx 60°$).

The system may generate natural, smooth motions that conform to the biomechanical characteristics of the human body by adjusting the amplitude A_i, frequency ω_i, phase φ_i, and coupling coefficient K_ij.

Optimization for Specific Scenarios

1. Low Signal-to-Noise Ratio Environment

Optimization for Weak Sound Recognition:

Preprocessing for spectral enhancement: Convolutional filters are used to enhance the audio spectrum to strengthen signals in key frequency bands while suppressing noise interference. The system specifically focuses on frequency bands primarily associated with human voices (e.g., 300 Hz-3 kHz) to enhance signals in these regions.

Extraction of self-supervised feature: Self-supervised learning based on large-scale audio data is employed to improve the model's sensitivity to weak signals. Self-supervised learning does not rely on manual annotations and may leverage large amounts of unlabeled audio data to learn effective sound representations.

Attention mechanism enhancement: particular attention mechanisms are adopted to automatically focus on key features of weak audio signals. The system may "listen" to subtle sound variations below 20 dB, even in a noisy environment.

Multi-scale feature fusion: Acoustic features at different time scales are combined to improve the recognition of weak non-verbal sounds (e.g., moans, sighs). The system conducts analyzing on both short-term features (e.g., instantaneous pitch) and long-term patterns (e.g., rhythm and emotional development).

2. High-Precision Action Recognition

Optimization for Fine Motion Detection:

Processing based on sliding window: Sliding window techniques are applied to analyze continuous motion data to accumulat micro-motion changes within 30 seconds. Analyzing based on window allows the system to capture gradual motion changes rather than just instantaneous states.

Bidirectional GRU temporal modeling: Bidirectional gated recurrent unit (GRU) networks are configured to process sequential data, to capture motion rhythms and trends. The gating mechanism of GRU learns both short-term and long-term motion patterns effectively.

Trend detector: A particular neural network branch may be used to conduct analyzing on changes in motion speed and amplitude. The system may identify motion trends such as "acceleration," "constant speed," or "deceleration," to provide predictive guidance for device responses.

High-precision sensor algorithms: A particular filtering and enhancement algorithm is used for millimeter-wave sensors and pressure sensors to detect acceleration changes as low as 0.2 $mm/s^2$ and pressure variations within the range of 1-5 g. Sensor data is processed by multi-stage low-pass filtering to remove noise while retaining true motion signals.

3. Confidence-Weighted Fusion Mechanism

Optimization for Modal Imbalance:

Modal-specific confidence: Reliability of data of each modal is independently evaluated to generate modal confidence scores. For example, in a noisy environment, the confidence of voice signals may be lower; when touch sensors are affected by external vibrations, the confidence of tactile signals may decrease.

Dynamic weight allocation: The weight of each modal in the fusion process is adjusted based on their confidence levels dynamically. When a quality of signal of a specific modal decreases, the system reduces its influence weight and prioritizes modal signals with higher-quality automatically.

Adaptive fusion strategy: The system selects the most suitable modal combinations and fusion ways automatically based on different scenarios and user habits. The system learns each user's interaction pattern preferences and adjusts the modal weight allocation strategy accordingly.

EXAMPLES OF PRACTICAL APPLICATIONS

1. Example 1: Interaction Between a User and an Intelligent Silicone Doll

Processing may be as follows:

1.1 Collecting multimodal data: A voice recognition system captures and transcribes the speech of "You look beautiful today."

a. Simultaneously extracts acoustic features of the voice (gentle tone, moderate speed).

b. The pressure sensor array detects gentle touch pressure (approximately 5-10 g).

c. The capacitive sensor tracks touch trajectories (slow and gentle facial touch).

1.2 Feature extraction: The language model extracts semantic features from the text and identifies the semantics of praise and intimacy.

a. The acoustic analyzer determines the tone is gentle and the emotion is positive.

b. The tactile analyzer identifies the touch pattern as "gentle stroking," expressing an intimate emotion.

1.3 Multimodal fusion: The Transformer fusion layer performs cross-attention processing on linguistic, acoustic, and tactile features.

a. Captures the consistency between the speech content and the touch pattern (both expressing gentle emotions).

b. Generates a unified multimodal representation, reinforcing the emotional information conveyed by all modalities.

1.4 Emotion classification: The system identifies the emotion class as "gentle/intimate" with 85% confidence.

a. The emotional intensity is evaluated as moderately high (0.75/1.0).

b. Trend analysis shows the emotion is stable with a slight upward trend.

1.5 Generating response by devices: Based on the emotion class "gentle/intimate", the corresponding device response mode is selected.

a. The facial expression controller is used to generate a smiling expression and slow blinking action.

b. Facial heating elements are activated to simulate a shy blushing reaction (temperature rises by 2° C.).

c. A gentle voice response is generated: "Thank you, I think you look particularly charming today too".

d. The limb controllers are coordinated to perform a gentle cuddling motion.

1.6 Feedback and adaptation: Interaction data is recorded to update the user preference model.

a. the baseline thresholds are adjusted for future interactions, so that the system is more sensitive to gentle interactions with this user.

2. Example 2: Interaction Between a User and an Intelligent Massager

Processing may be as follows.

2.1 Collecting Data in a low signal-to-noise ratio environment: An enhanced acoustic processor captures weak speech or non-verbal sounds, such as "Can you go a bit faster?"

a. Spectral enhancement technology may be used to strengthen key frequency bands, to improve signal quality.

b. High-precision accelerometers may be used to capture subtle wrist acceleration movements.

c. The temporal processor accumulates motion variation data over 30 seconds.

2.2 Enhanced feature extraction: An acoustic analyzer extracts features of speech/non-verbal sounds for weak signals.

a. A motion analysis system identifies an increasing trend in wrist motion frequency.

b. The pressure analyzer determines pressure variation patterns, to determine changes in intensity during using.

2.3 Confidence-weighted fusion: Confidence scores for voice and motion data are determined.

a. In a quiet environment, the confidence of voice data may be low (approximately 40%).

b. Motion data confidence is relatively high (approximately 90%).

c. The system increases the weight of motion data and reduces the weight of voice data automatically.

d. A fused representation is generated, primarily based on motion features supplemented by voice features.

2.4 State recognition: The system identifies the state as "excited/anticipating reinforcement" with 93% confidence.

a. Intensity evaluation shows a gradual increase (from 0.60 to 0.85).

b. Trend analysis indicates an accelerating trend, expected to continue strengthening.

2.5 Adjusting device parameter: Based on the identified state and trend, a plan for adjusting device parameter is generated.

a. The vibration frequency gradually increases from 65 Hz to 90 Hz (initial adjustment completed within 3 seconds).

b. The amplitude intensity is gradually increased from 60% to 75%.

c. The vibration mode transitions to a wave-like fluctuation pattern, to increase variation.

d. The device temperature slightly rises (approximately 2° C.), to increase tactile stimulation.

Continuous monitoring and fine-tuning: The system continuously monitors user responses and optimizes parameters every 20 seconds.

a. When changes in user voice features are detected, further adjustments are made to the vibration mode.

b. The system records the user's reactions to specific parameter combinations to optimize personalized configurations.

Privacy Protection and Security Processing

Data Security

Local processing: Analyzing on core emotion is conducted locally on the device, and sensitive data is not uploaded to the cloud.

Data anonymization: Necessary data collection undergoes strict anonymization processes to remove personally identifiable information.

Differential privacy: Differential privacy technology is applied to protect user preference data by adding noise, which is well-controlled.

Data encryption: All stored and transmitted data is protected with highly complicated encryption.

System Security

Secure boot: Devices use secure boot mechanisms to ensure only authorized software is executed.

Access control: Strict permission management is implemented to restrict access to sensitive functions.

Regular updates: Security updates are provided regularly to patch potential vulnerabilities.

User authorization: All advanced functions require explicit user authorization to be enabled.

Deployment and Optimization

Model Compression and Optimization

Model quantization: Floating-point operations are converted to fixed-point operations to reduce model size and accelerate inference.

Knowledge distillation: Core knowledge is extracted from complex models to be used in training for a lighter model.

Architecture optimization: Network architecture is optimized for embedded devices to reduce complexity in computing.

Selective activation: some of components in a model are selectively activated based on scenario requirements to save energy.

Embedded Deployment

Resource allocation: Computation resources are allocated as needed based on the device's hardware capabilities.

Power management: Intelligent power management strategies are implemented to extend battery's lifetime.

Thermal management: Thermal management is optimized to ensure stability during operation in long time.

Asynchronous processing: Asynchronous processing mechanisms are adopted to ensure smooth user interface responsiveness.

Summary

The system is configured as a complete multimodal emotion recognition and interaction solution, which may be embedded into adult products. The system may provide high-precision emotion recognition by using the following key features:

1. Multimodal feature extraction and fusion to process linguistic, acoustic, tactile, and visual data.
2. Cross-modal attention mechanism based on Transformer configured to capture correlations among various modalities.
3. Temporal analysis module configured to perceive emotion changing trends.
4. Adaptive threshold mechanism configured to dynamically adjust confidence scores based on historical interactions.

5. Two-stage training strategy for pretraining based on general data, which is followed by fine-tuning for specific scenarios.

The system generates corresponding device responses based on recognized emotion states, to provide a more natural and immersive interactive experience while ensuring user data privacy and system security.

Step 1: Feature Extraction

When multimodal information is input from user, such as voice, image, text, body motion, or external environmental information involving two or more modalities, features of each single modal are extracted separately to obtain corresponding feature vectors, as follows:

(1) Voice Modal Features:

The voice emotion analysis module is used to extract emotional features from the voice, such as fundamental frequency, pitch, and speech rate.

Example of feature vector: F_voice=[0.5, 0.8, 0.3].

(2) Image Modal Features:

The image processing module is used to extract visual features from user expressions or movements, such as facial key points and motion postures.

Example of feature vector: F_image=[0.2, 0.6, 0.4].

(3) Text Modal Features:

The natural language processing module (e.g., pretrained language model BERT) is used to extract semantic features.

Example of feature vector: F_text=[0.9, 0.7, 0.1].

(4) Body Motion Modal Features:

The motion capture module (e.g., inertial measurement units or cameras) is used to extract the user's motion trajectories and frequency features.

Example of feature vector: F_motion=[0.4, 0.5, 0.7].

(5) External Environmental Modal Features:

Sensors are used to collect environmental data (e.g., brightness, temperature, sound) and extract features.

Example of feature vector: F_env=[0.3, 0.2, 0.6].

It should be understood that in other embodiments, external environmental modal features may be unused.

Step 2: Feature Normalization

Each modal's feature vector is normalized to bring all feature values into the same range (e.g., [0, 1]) to balance influences of various modalities on subsequent fusion.

For example, after normalization, F_voice=[0.5, 0.8, 0.3] may become F_voice_normalized=[0.625, 1.0, 0.375].

Step 3: Concatenation Fusion

The normalized features of all modalities are directly concatenated into a high-dimensional feature vector, to form a preliminary fused feature representation. The concatenated feature vector contains complete information from all modalities, as shown below:

For example:

Voice modal features: F_voice_normalized=[0.625, 1.0, 0.375].

Image modal features: F_image_normalized=[0.2, 0.6, 0.4].

Text modal features: F_text_normalized=[0.9, 0.7, 0.1].

Body motion modal features: F_motion_normalized=[0.4, 0.5, 0.7].

After concatenation,

F_concat=[0.625, 1.0, 0.375, 0.2, 0.6, 0.4, 0.9, 0.7, 0.1, 0.4, 0.5, 0.7].

Step 4: Modeling Inter-Modal Relationships (Based on Attention Mechanism)

An attention mechanism is applied on the concatenated high-dimensional feature vector to determine a weight of each modal to highlight the most important modal features for the current scenario. Specifically, this step 4 may be conducted as follows:

(1) Determining Attention Weights:

A self-attention mechanism or multi-head attention mechanism is used to adjust modal weights dynamically based on contextual information (e.g., the user's current emotional state).

Example of weights:

Voice modal weight: α_voice=0.4.

Image modal weight: α_image=0.3.

Text modal weight: α_text=0.2.

Body motion modal weight: α_motion=0.1.

(2) Weighted Feature Fusion:

The concatenated features are weighted by modal weights to obtain the weighted fused feature representation:

$$F\_weighted=\alpha\_voice*F\_voice\_normalized+\alpha\_image*F\_image\_normalized+\alpha\_text*F\_text\_normalized+\alpha\_motion*F\_motion\_normalized.$$

F_weighted is a final fused feature vector. It integrates information from voice, image, text, and motion modalities. This F_weighted may be used as input for subsequent tasks such as emotion recognition, behavior prediction, or decision-making.

α_-voice is a weight of the voice modal, and F_voice_normalized is the normalized voice feature vector.

α_image*F_image_normalized is a weighted normalized image feature.

α_text*F_text_normalized is a weighted normalized text feature.

α_motion*F_motion_normalized is a weighted normalized motion feature.

Step 5: Deep Feature Extraction

The weighted fused features are input into a deep learning network (e.g., a multilayer perceptron MLP or Transformer) to further extract nonlinear relationships between modalities and generate the final unified feature representation.

(1) Deep Learning Network:

Input layer configured to receive fused feature vector F_weighted=[0.53, 0.77, 0.36].

Hidden layers configured to extract complex inter-modal interactions through a multilayer perceptron (MLP) or Transformer.

Activation function configured to conduct activation by using ReLU or GELU to enhance the nonlinear representation capability of features.

Output layer configured to generate the final unified feature representation.

(2) Final Feature Representation:

Example of output vector:

F_final=[0.6, 0.8, 0.5, 0.4, 0.7].

This vector contains the integrated semantic features of multimodal information and can be directly input into a multimodal model (e.g., GPT) to be used in recognizing user's intent.

It should be understood that the above descriptions of features and their vectors are merely examples provided to facilitate understanding by skilled in the art. In other embodiments, other vector representations may be used, and the present disclosure is not limited by the above examples.

Further, as mentioned in the above embodiment, the emotion state quantization feature is an indicator for expressing the user's emotions quantitatively so as to reflect the changes in the user's emotions accurately during the use of adult products. With the emotion state quantization feature, precise control or dynamic adjustment may be applied on the operating parameters of adult products (such as vibration intensity, frequency, motion mode, movement amplitude, etc.). Therefore, to facilitate the understanding of the specific implementation of the emotion state quantization feature in the control process, an exemplary description is provided below. Reference could be made to the above introduction for any operation, which is not described in detail herein. Specifically, this example includes the following.

1. Range and Definition of Emotion State Quantization Features

In this example, the value range of the emotion state quantization feature is set to 0-10, with specific classifications and meanings as follows:

0: No emotion detected (noise or invalid data).

1-2: Mild state (e.g., slight liking or low excitement).

3-5: Normal state (e.g., moderate liking or medium excitement).

6-7: Strong state (e.g., strong liking or high excitement).

8-10: Extreme state (e.g., extreme liking or very high excitement).

2. Examples of Emotion State Quantization Features Set in Applications

During control of adult products, the emotion state quantization feature may be directly used to adjust the operating parameters of the product. For example, when the emotional feature is "liking," vibration intensity and frequency may be set based on the quantization feature value correspondingly.

i1. Mild State (1-2):

Vibration intensity is set to the lowest range (e.g., 20%-40% of power).

Vibration frequency is maintained at a low range (e.g., 1-3 Hz).

i2. Normal State (3-5):

Vibration intensity is set to a medium range (e.g., 50%-70% of power).

Vibration frequency is maintained at a medium range (e.g., 4-6 Hz).

i3. Strong State (6-7):

Vibration intensity is set to a higher range (e.g., 80%-90% of power).

Vibration frequency is increased to a higher range (e.g., 7-9 Hz).

i4. Extreme State (8-10):

Vibration intensity is set to the maximum safe range (e.g., 95%-100% of power).

Vibration frequency reaches the highest allowable frequency of the device (e.g., 10-12 Hz).

It should be noted that the above parameter ranges are within the safe design range of adult products and may be preset or adjusted based on user preferences. In other embodiments, there may be more or fewer states set for emotion features. Generally, one setting for emotion states may includes at least two or more quantized classifications. The more states are set, the higher the precision requirement for user intent recognition, and correspondingly, the finer the control of the adult product. By using the emotion state quantization feature for multi-level classification of the same emotional state, the requirements on intelligent interaction between the user and the adult product during use may be satisfied more, and the emotion interaction with the user becomes more precise.

3. Generation of Emotional State Quantization Features

In this example, the emotional state quantization feature is generated by using multimodal emotion recognition. The operational steps may be as follows:

(1) Data Collection

Emotion-related data is collected by using multimodal information, including but not limited to voice data, image data, and external environment data, wherein:

Voice data is obtained by collecting user's voice through a microphone and extracting voice features such as pitch, volume, and speech rate.

Image data is obtained by collecting user's facial expression or body movements through a camera and extracting visual features such as facial key points or body movements.

External environment data is obtained by collecting environmental information through sensors to facilitate emotion recognition and the environmental information may be e.g., background music and light intensity.

In other examples, one or more of the above data may be collected, e.g., external environment data may be omitted.

(2) Feature Extraction

Features are extracted from the collected data to generate multimodal emotional features:

i1. Voice Emotion Features, Including:

Extracting features such as fundamental frequency, volume, speech rate, and pitch from audio signals.

Generating emotion vectors.

i2. Facial Expression Features:

Determining facial key points (e.g., positions of eyebrows, mouth corners, and eyes) and extracting expression features.

Using a facial expression recognition model to predict emotion classes.

i3. Body Motion Features:

Analyzing the user's motion trajectory, frequency, and intensity, such as through an inertial measurement unit (IMU).

Using a motion pattern classifier to identify motion features related to emotions.

(3) Modal Fusion

Multimodal features are fused into a unified emotional feature vector, specifically including the following operations:

Concatenation fusion: Directly concatenating features of each modal into a high-dimensional feature vector.

Weighted summation fusion: Adjusting modal weights dynamically by using an attention mechanism to highlight key modalities.

Deep fusion: Using a fusion network (such as Transformer or a multilayer perceptron MLP) to extract nonlinear relationships between modalities and generate a unified emotional vector.

4. Emotional State Quantization

An emotion classifier is added to the neural network model to quantify the emotional state. The specific operations are as follows:

(1) Classifier:

Using a fully connected layer with a Softmax activation function to classify emotion classes.

Example of output class: liking, disliking, excitement, calmness, etc.

(2) Quantization Feature Generation:

Quantized feature values (in a range of 0-10) are generated based on the predicted scores of emotion class in connection with contextual information.

Example

If the emotion is classified into "liking" with a predicted score of 0.85, a quantized value of 7.5 is generated according to the mapping rule.

Of course, the mapping rule may be adjusted based on experimental data. The above is only an example.

Real-Time Updating and Feedback

During the use of adult products, real-time emotion recognition and quantization adjust the operating state of the product dynamically.

For example, the system updates the emotional state quantization feature in a preset time interval (e.g., 5 seconds) and then adjusts parameters (such as motion speed, vibration intensity, and frequency) based on the latest quantized feature value.

With the above example process, the implementation of emotion state quantization in the embodiments of the present disclosure may be understood clearly. Of course, in other embodiments, other methods for setting emotional state quantization may be adopted.

In the above embodiments of the present disclosure, the system for interactive controlling on adult product based on a multimodal model may be implemented by referring to any of the technical steps in the above-mentioned methods.

Based on same technical concept of the method for interactive controlling on adult product based on a multimodal model, another embodiment of the present disclosure further provides an electronic device, including a memory, a processor, and a computer program stored in the memory and capable of running on the processor. The processor executes the program to implement the steps of the method for interactive controlling on adult product based on a multimodal model.

Refer to FIG. 4, which shows a block diagram of an electronic device according to an exemplary embodiment. As shown in FIG. 4, the electronic device may include: processor 401, memory 402. The electronic device may further include one or more of multimedia component 403, input/output interface 404, communication component 405, and power components 406. Processor 401 obtains user-side information and extracts feature representations, identifies user intent based on the multimodal model, generates control commands based on user intent, and converts them into control signals, which are sent to the control system of the adult product through communication component 405 to execute corresponding actions.

Processor 401 is configured to control overall operation of the electronic device to complete all or part of the steps of the method or interactive controlling on adult product based on a multimodal model in the first aspect. Memory 402 is configured to store various types of data to support the operation of the electronic device. Such data may include instructions for any application or method configured to operate on the electronic device, as well as data related to applications, such as user's information, received and sent messages, pictures, audio, video, etc.

Multimedia component 403 may include a camera and audio component 410, etc., and may further include a screen as needed. The screen may be a touch screen, and the camera may be configured to capture images. Audio component 410 is configured to output and/or input audio signals. For example, audio component 410 may include a microphone configured to receive external audio signals. The received audio signals may be further stored in memory 402 or sent through communication component 405. Audio component 410 includes at least one speaker configured to output audio signals.

Input/output interface 404 provides an interface between processor 401 and other interface modules, which may include a keyboard, mouse, buttons, etc. These buttons may be virtual or physical buttons. Communication component 405 is configured to enable wired or wireless communication between the electronic device and other devices. Wireless communication may include Wi-Fi, Bluetooth, Near Field Communication (NFC), 2G, 3G, 4G, NB-IOT, eMTC, or other 5G technologies, or a combination of one or more of them, which is not limited herein. Therefore, the corresponding communication component 405 may include: Wi-Fi module, Bluetooth module, NFC module, etc.

The electronic device in this embodiment can be provided on adult products or set independently. For example, it can be made into a very small control box provided in the head position of an adult product doll, similar to the existence of a human brain. It forms control commands based on the acquired user-side information and user intent to control the use of the adult product doll. It can also be made into a small component set within the adult product.

Alternatively, the memory is configured to store programs. The memory may include volatile memory, such as random-access memory (RAM), static random-access memory (SRAM), or Double Data Rate Synchronous Dynamic Random Access Memory (DDR SDRAM), etc. The memory may further include non-volatile memory, such as flash memory. The memory is configured to store computer programs (such as applications or functional modules that implement the above methods), computer instructions, etc. The computer programs, computer instructions, etc., may be partitioned and stored in one or more memories. Furthermore, the computer programs, computer instructions, and data may be called by the processor.

The processor is configured to execute the computer program stored in the memory to implement the steps of the methods described in the above embodiments. Specific implementation may refer to the relevant descriptions in the previous method embodiments.

The processor and memory may have an independent structure or be integrated into a single structure. When the processor and memory are independent structures, the memory and processor may be coupled and connected via a bus.

In addition, the embodiments of the present disclosure may further provide a computer-readable storage medium. The computer-readable storage medium stores computer-executable instructions. When the computer program is executed by the processor, it implements the steps of the method for interactive controlling on adult product based on a multimodal model The computer-readable medium includes computer storage media and communication media, where communication media include any medium that facilitates the transfer of computer programs from one place to another. The storage media may be any available medium accessible by a general-purpose or special-purpose computer. An exemplary storage medium is coupled to the processor, enabling the processor to read information from and write information to the storage medium. Of course, the storage medium may also be part of the processor. The processor and storage medium may be located in an ASIC. Additionally, the ASIC may be located in user equipment. Of course, the processor and storage medium may also exist as separate components in communication devices.

Those skilled in the art can understand that all or part of the steps of the above-described method embodiments can be completed by hardware related to program instructions. The aforementioned program can be stored in a computer-readable storage medium. When executed, the program performs the steps of the above method embodiments. The aforementioned storage medium includes ROM, RAM, magnetic disks, optical disks, or other media capable of storing program codes.

Finally, it should be noted that the above embodiments are only used to illustrate the technical solutions of the present disclosure, without limiting them. Although the present disclosure has been described in detail with reference to the above embodiments, those skilled in the art should understand that they can still modify the technical solutions described in the above embodiments or replace some or all of the technical features with equivalents. These modifications or replacements do not cause the essence of the corresponding technical solutions to deviate from the scope of the technical solutions of the embodiments of the present disclosure. The above preferred features can be used in any combination as long as they do not conflict.

The invention claimed is:

1. A method for dynamically controlling a physical actuator of an adult product, comprising:

acquiring perception data of a user interacting with the adult product by at least one microphone and at least one sensor, wherein the perception data of the user comprises one or more modal data of voice data, tactile data, and visual data; the at least one sensor comprises at least one pressure sensor;

processing the perception data of the user by using a processor to run a multimodal neural network model, which comprises: conducting feature-extracting on the one or more modal data in the perception data to obtain modal feature vectors corresponding to the one or more modal data respectively; applying an attention mechanism to each modal feature vector to obtain modal weights by calculation and generate a weighted cross-modal feature representation that quantifies an emotional state of the user; mapping the weighted cross-modal feature representation to a specific emotion class of the user selected from a predefined set of emotion classes;

conducting a search in a data structure of action parameter vectors to generate a multi-component action parameter vector, A=[a1, a2, . . . , an], wherein the data structure of action parameter vectors stores predefined action parameter vectors for each emotion class in the predefined set of emotion classes as a response to the specific emotion class of the user; each component of the action parameter vector represents a specific numerical control value for an independent physical control dimension of the adult product, the physical control dimensions comprising at least vibration frequency and contraction intensity; and converting the numerical control values of the action parameter vector into drive signals and transmitting the drive signals to the physical actuator, so that the adult product performs physical actions defined by the numerical control values, wherein the conducting feature-extracting on the one or more modal data in the perception data to obtain modal feature vectors corresponding to the one or more modal data respectively comprises:

when the perception data comprises voice data, converting voice data using a pre-trained language model into voice text and extracting semantic representation vectors, extracting fundamental audio features from the voice data using Mel-frequency cepstral coefficients, and extracting acoustic feature vectors from the fundamental audio features using spectrum analysis, wherein the acoustic feature vectors comprise fundamental frequency, energy, and harmonic-to-noise ratio;

when the perception data comprises tactile data, processing tactile data by using a multilayer perceptron network to obtain tactile features vectors corresponding to tactile data, wherein the tactile feature vectors comprise one or more of touch pattern, touch force, touch rhythm, touch trajectory, touch area, and action frequency; and when the perception data comprises visual data, extracting facial expression features based on a facial recognition neural network, determining gazing duration and gazing frequency using a pupil tracking algorithm to obtain eye contact feature vectors, and extracting body posture feature vectors using a human pose estimation model.

2. The method for dynamically controlling a physical actuator of an adult product according to claim 1, further comprising:

acquiring real-time feedback data from the user, wherein the feedback data includes behavior response; and dynamically adjusting the predefined action parameter vectors stored in the data structure based on the real-time feedback data.

3. The method for dynamically controlling a physical actuator of an adult product according to claim 1, wherein after determining the specific emotion class of the user from the predefined set of emotion classes, the method further comprises:

evaluating confidence of the emotion class by using a neural network.

4. The method for dynamically controlling a physical actuator of an adult product according to claim 1, further comprising:

forming temporal sequence features from the modal feature vectors corresponding to each type of modal data within a preset period and determining dynamic changes in emotion recognitions by processing the temporal sequence features using a long short-term memory network, to determine an emotional trend;

determining a moment of change in emotion, by focusing on transition points in the temporal sequence features with attention weights.

5. The method for dynamically controlling a physical actuator of an adult product according to claim 1, further comprising:

collecting user's interaction data and feedback information;

updating parameters of the multimodal model dynamically using deep learning algorithms and reinforcement learning algorithms;

adjusting control logic to meet user's personalized needs adaptively and optimizing determining on user intent and control strategies.

6. The method for dynamically controlling a physical actuator of an adult product according to claim 1, further comprising:

downloading and installing a latest multimodal model parameters or control logic through a network connection or from a cloud platform to conduct an update process, wherein the update process uses digital signatures and verification mechanisms to ensure authenticity and integrity of content being updated.

7. A method for interactive controlling on an adult product based on a multimodal model, comprising:

acquiring perception data of a user interacting with the adult product, wherein the perception data of the user comprises one or more modal data of voice data, tactile data, and visual data;

conducting feature-extracting on the one or more modal data in the perception data to obtain modal feature vectors corresponding to the one or more modal data respectively;

conducting feature-fusing on the extracted modal feature vectors to form cross-modal feature representation so as to determine an emotion class of the user from a predefined set of emotion classes;

conducting a search in a data structure of action parameter vectors according to the emotion class of the user, to determine a control instruction for the adult product; and converting the control instruction into drive signals for the adult product, so that the adult product performs actions corresponding to the drive signals, wherein the conducting feature-extracting on the one or more modal data in the perception data to obtain modal feature vectors corresponding to the one or more modal data respectively comprises:

when the perception data comprises voice data, converting voice data using a pre-trained language model into voice text and extracting semantic representation vectors, extracting fundamental audio features from the voice data using Mel-frequency cepstral coefficients, and extracting acoustic feature vectors from the fundamental audio features using spectrum analysis, wherein the acoustic feature vectors comprise fundamental frequency, energy, and harmonic-to-noise ratio;

when the perception data comprises tactile data, processing tactile data by using a multilayer perceptron network to obtain tactile features vectors corresponding to tactile data, wherein the tactile feature vectors comprise one or more of touch pattern, touch force, touch rhythm, touch trajectory, touch area, and action frequency; and when the perception data comprises visual data, extracting facial expression features based on a facial recognition neural network, determining gazing duration and gazing frequency using a pupil tracking algorithm to obtain eye contact feature vectors, and extracting body posture feature vectors using a human pose estimation model.

8. The method according to claim 7, wherein the conducting a search in a data structure of action parameter vectors according to the emotion class of the user, to determine a control instruction for the adult product comprises:

conducting the search in a data structure of action parameter vectors to generate a multi-component action parameter vector A=[a1, a2, . . . , an], wherein the data structure of action parameter vectors stores predefined action parameter vectors for each emotion class in the predefined set as a response to the emotion class of the user; the control instructions are configured to adjust one or more of a motion mode, intensity, or frequency of the adult product, wherein, each component of A, a1, a2, . . . , an represents a specific numerical control value for an independent physical control dimension of the adult product, the physical control dimensions comprise one or more of vibration frequency, vibration intensity, contraction frequency, contraction intensity, swing amplitude, swing speed, temperature change amplitude, and pressure intensity of tactile feedback.

9. The method according to claim 7, wherein the conducting feature-fusing on the extracted modal feature vectors to form cross-modal feature representation so as to determine the emotion class of the user from the predefined set of emotion classes comprises:

projecting each modal feature vector into a common dimensional feature space by linear mapping, to generate aligned modal features;

determining attention scores between the aligned modal features by calculation, to determine modal weights for generating a weighted cross-modal feature representation, and generate the weighted cross-modal feature representation that quantifies an emotional state of the user;

mapping the weighted cross-modal feature representation to the emotion class of the user selected from a predefined set of emotion classes.

10. The method according to claim 7, wherein the control instruction further comprises one or more of:

voice control instruction, configured to make a selection among preset voice feedback templates and adjust voice parameters according to the emotion class of the user;

atmosphere control instruction, configured to change one or more of brightness of a light source, color of the light source, flicker frequency of the light source, and background music, based on the emotion class of the user.

11. The method according to claim 7, further comprising:

performing multi-factor authentication and authorization management on user's identity to ensure that only authorized users control current adult product;

encrypting user data in a way of end-to-end to prevent unauthorized access and data leaks;

monitoring an execution process of the control instructions to block abnormal instructions when being detected, so as to ensure safe use.

12. The method according to claim 7, further comprising:

downloading and installing a latest multimodal model parameters or control logic through a network connection or from a cloud platform to conduct an update process, wherein the update process uses digital signatures and verification mechanisms to ensure authenticity and integrity of content being updated.

* * * * *